Aug. 22, 1933.                J. E. LOVELY                    1,923,493
                                  LATHE
                       Filed March 28, 1930         17 Sheets-Sheet 1

Inventor
John E. Lovely
by Wright, Brown, Quinby & May
Attys.

Aug. 22, 1933.  J. E. LOVELY  1,923,493
LATHE
Filed March 28, 1930   17 Sheets-Sheet 2

Inventor
John E. Lovely
by
Wright, Brown, Quinby & May
Attys.

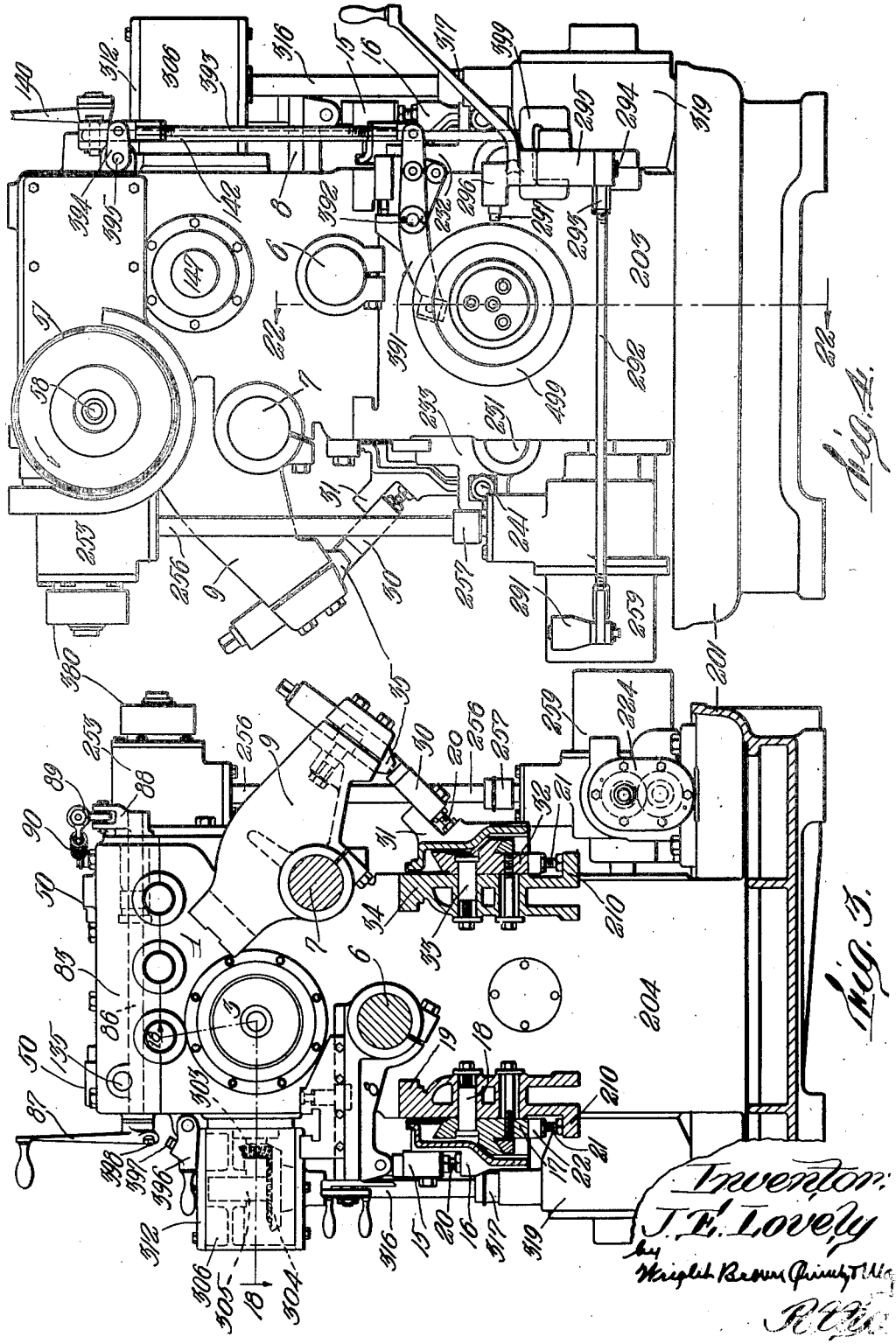

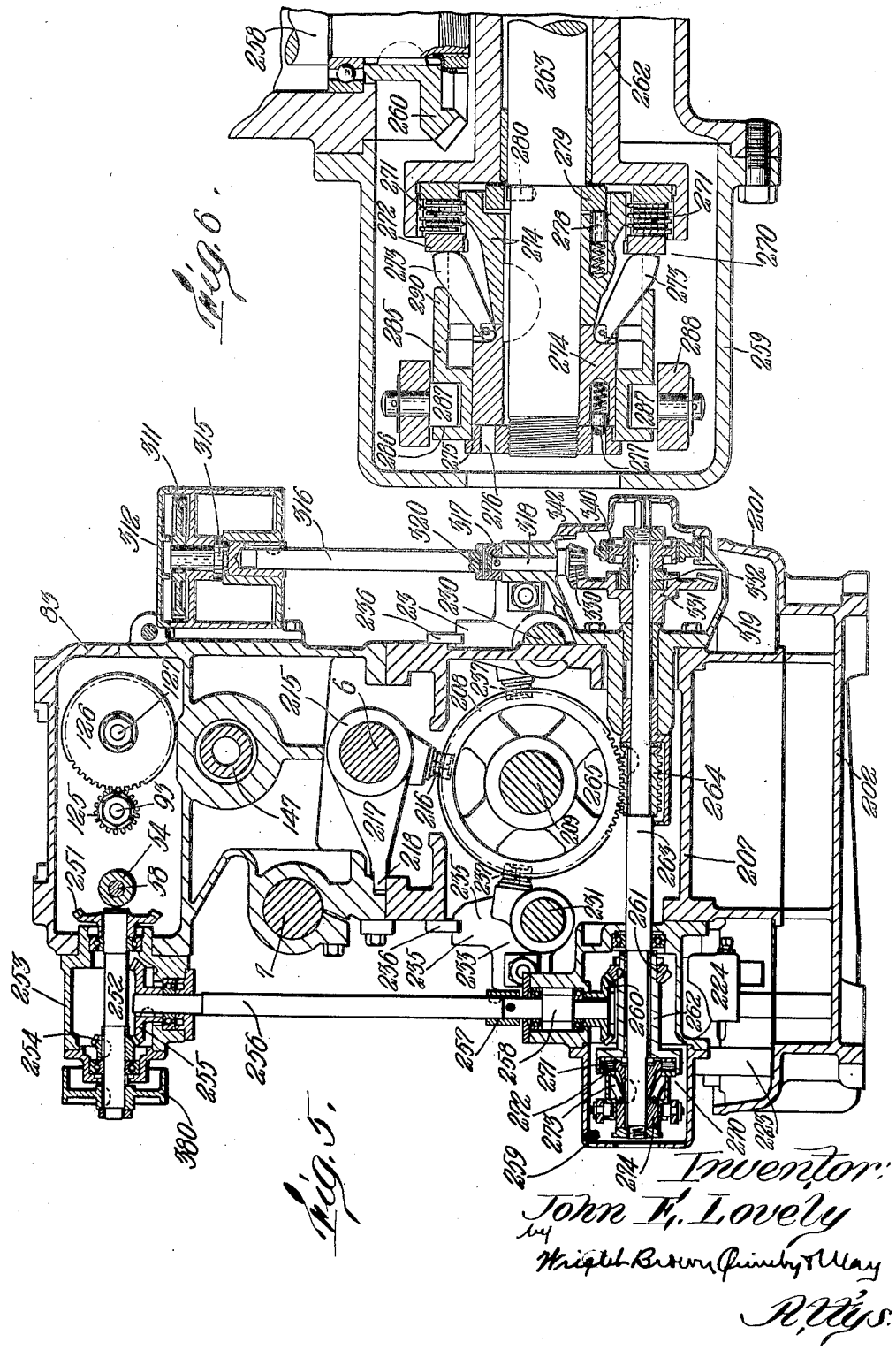

Aug. 22, 1933.  J. E. LOVELY  1,923,493
LATHE
Filed March 28, 1930  17 Sheets-Sheet 5
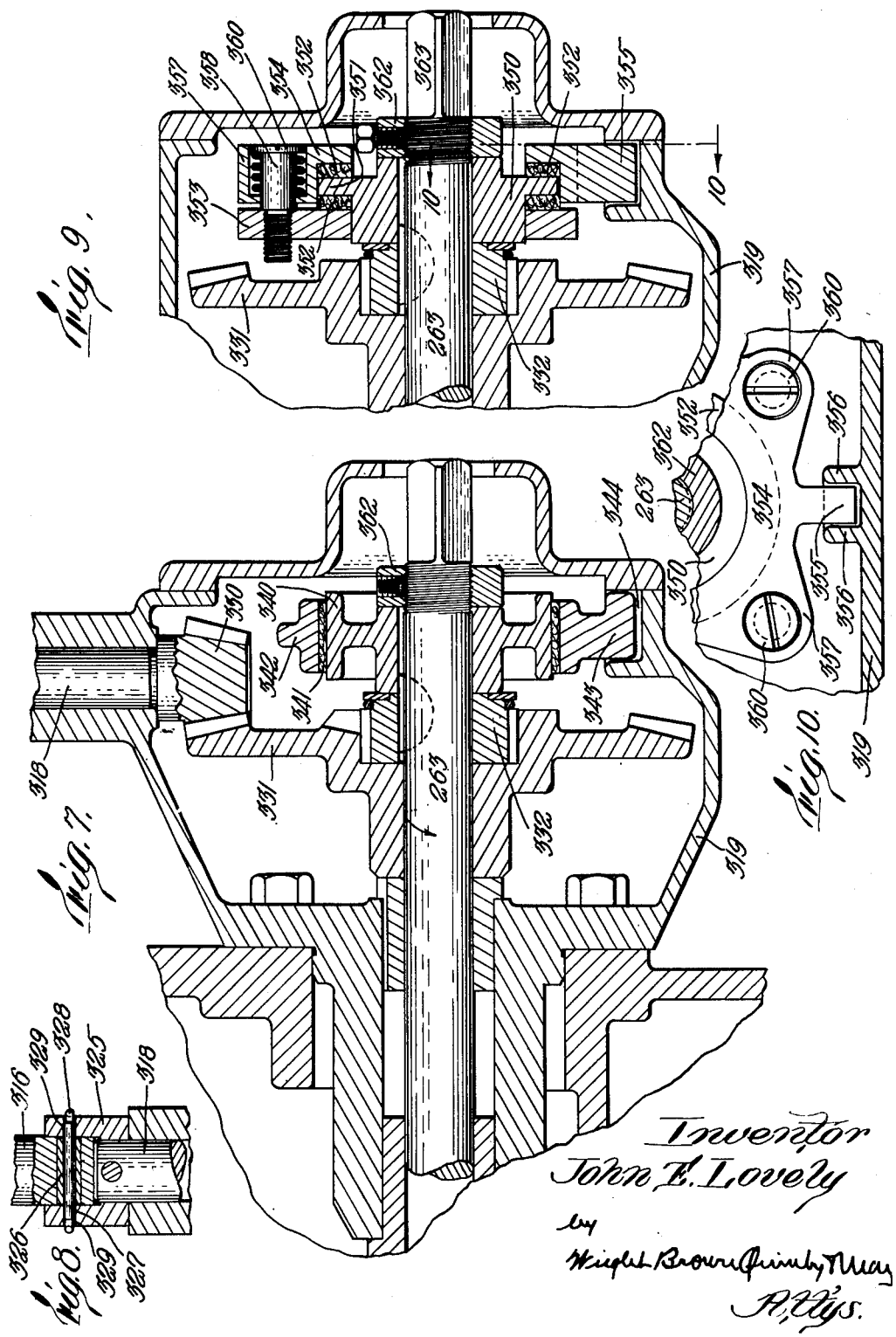

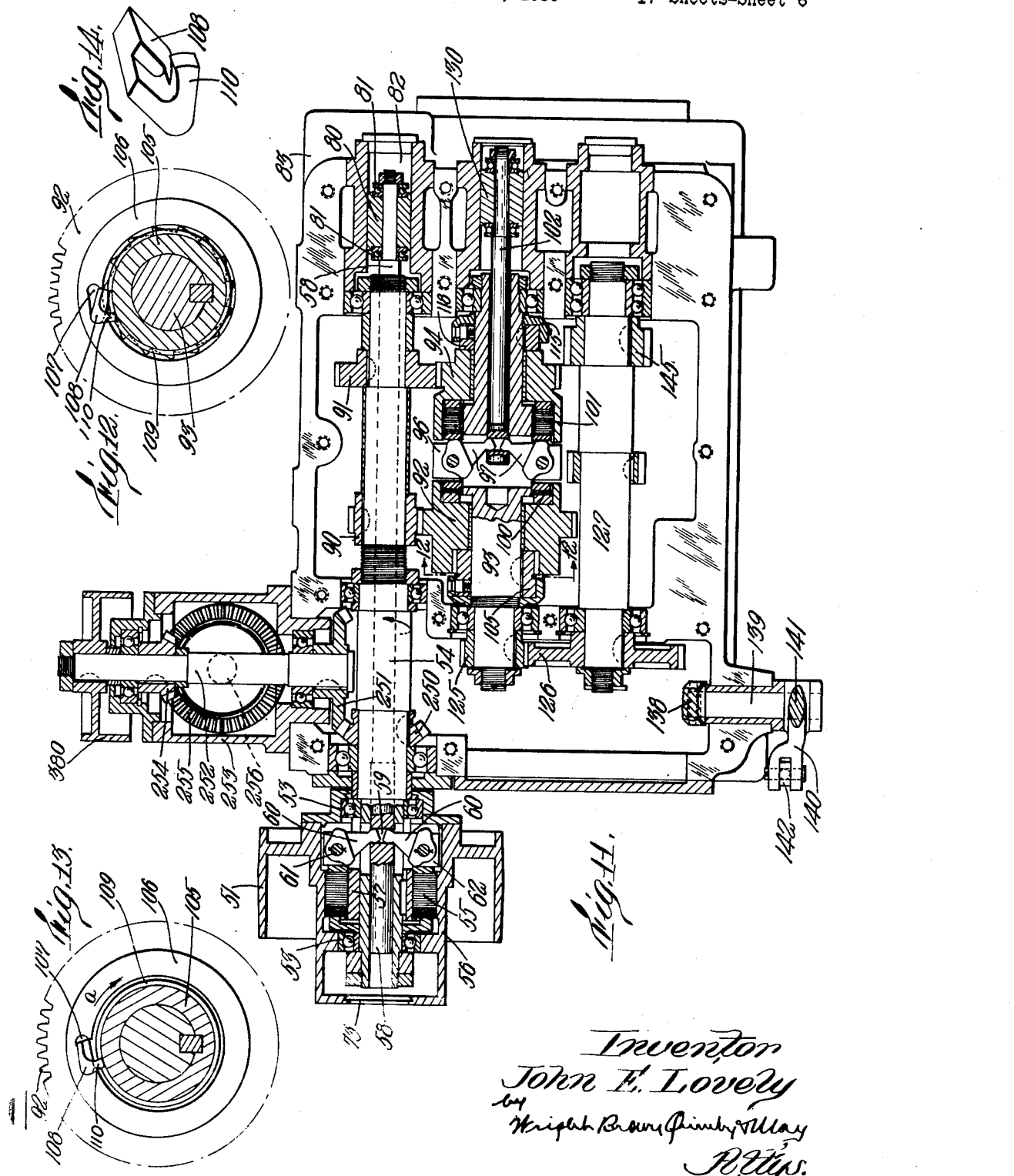

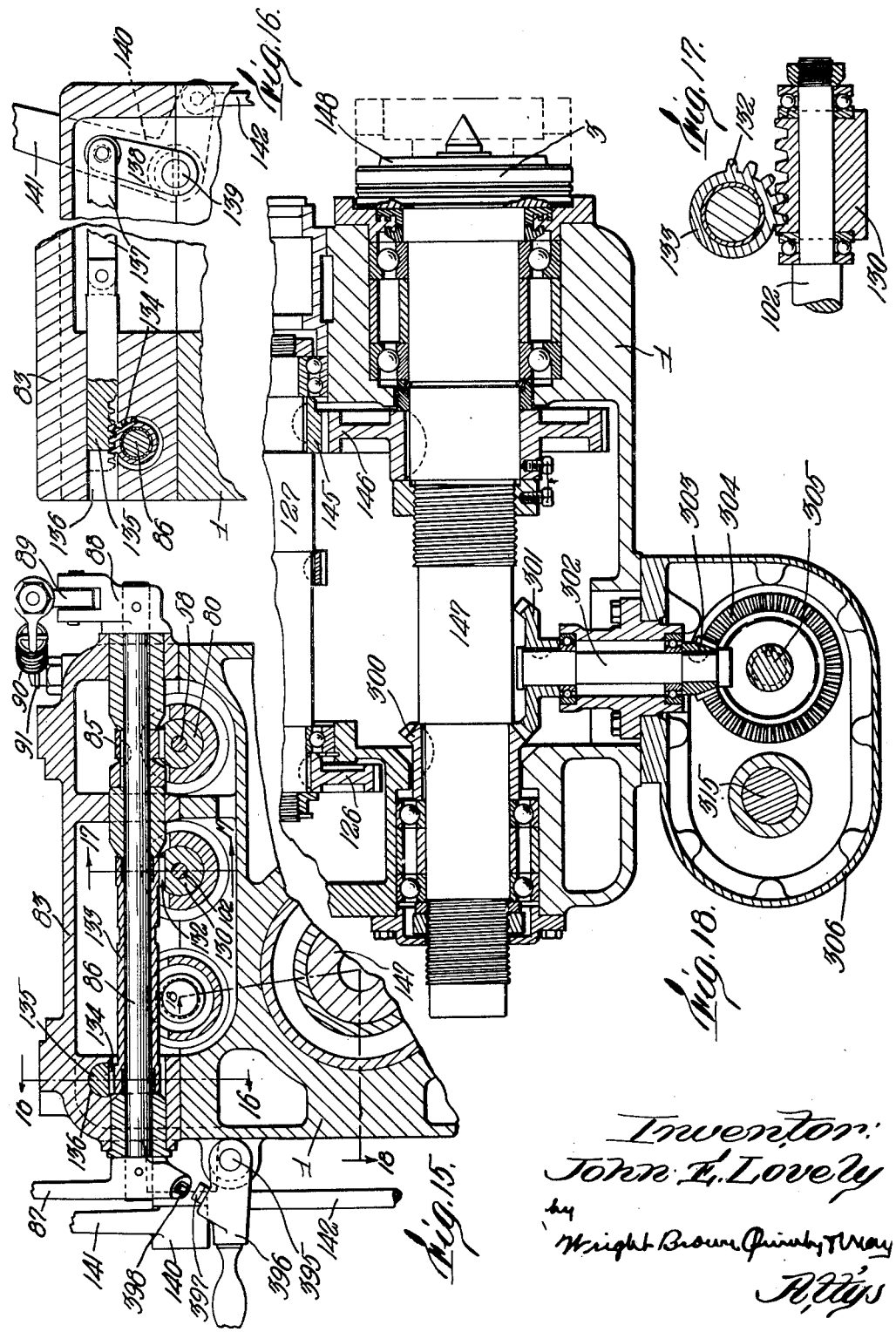

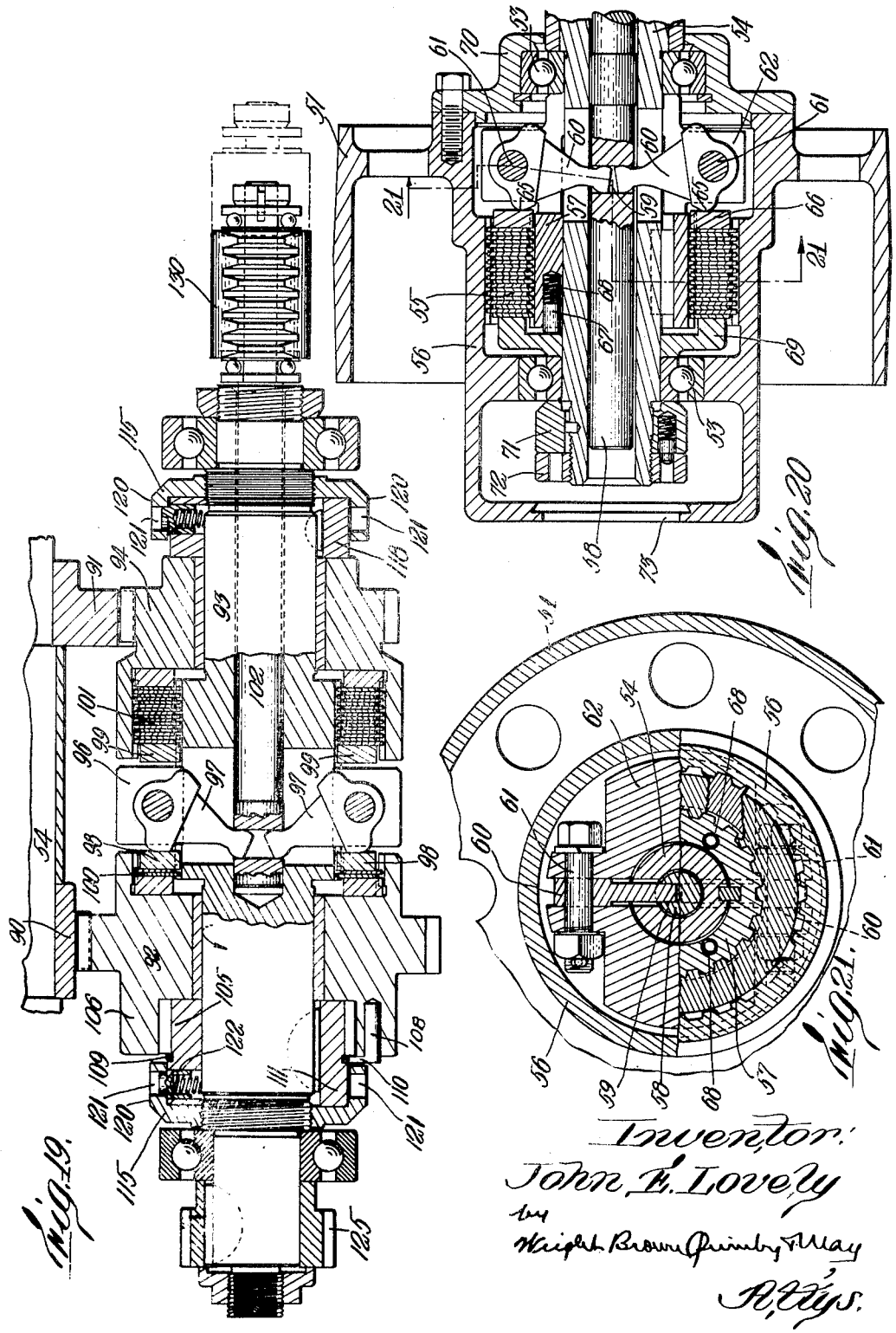

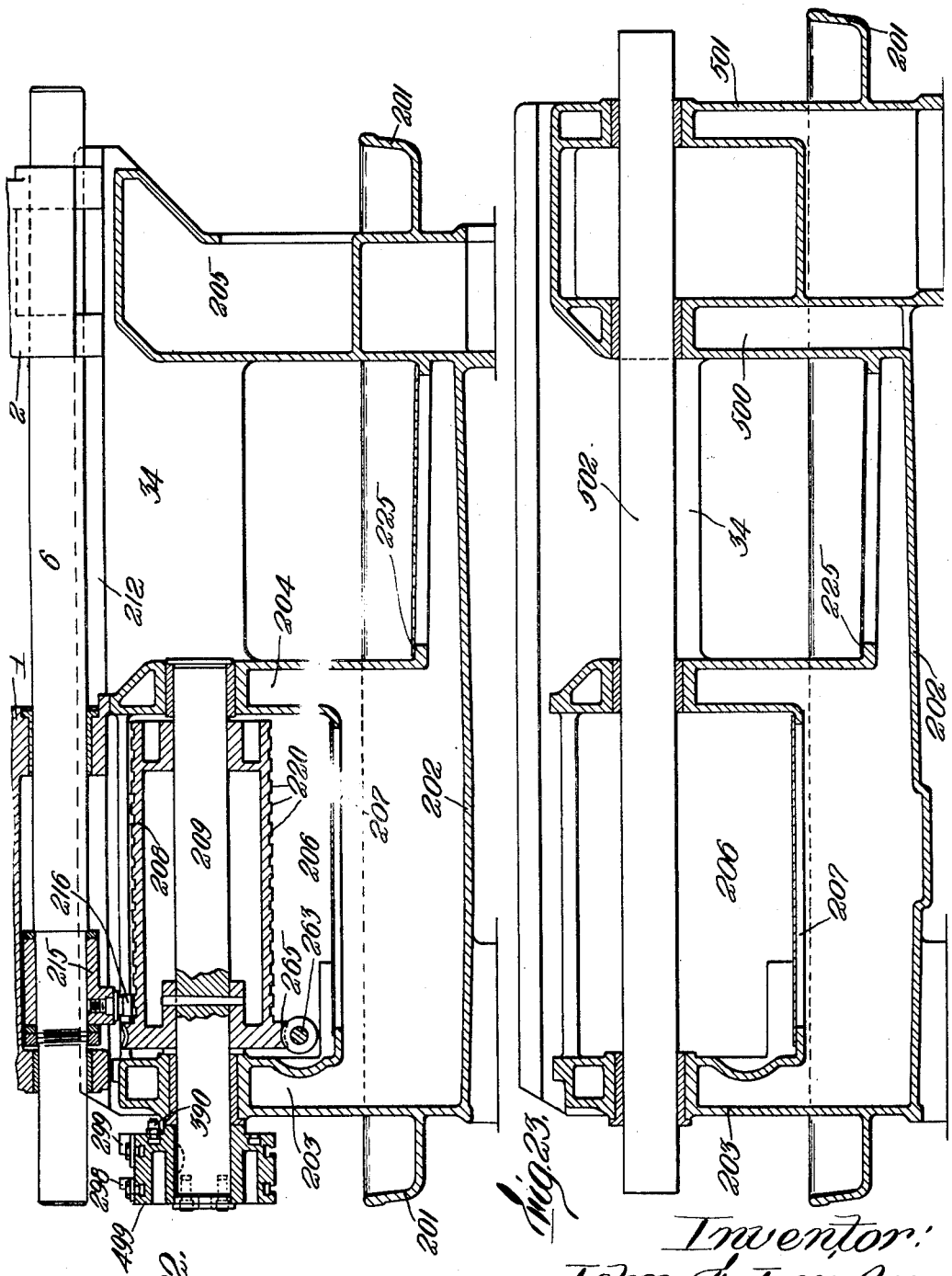

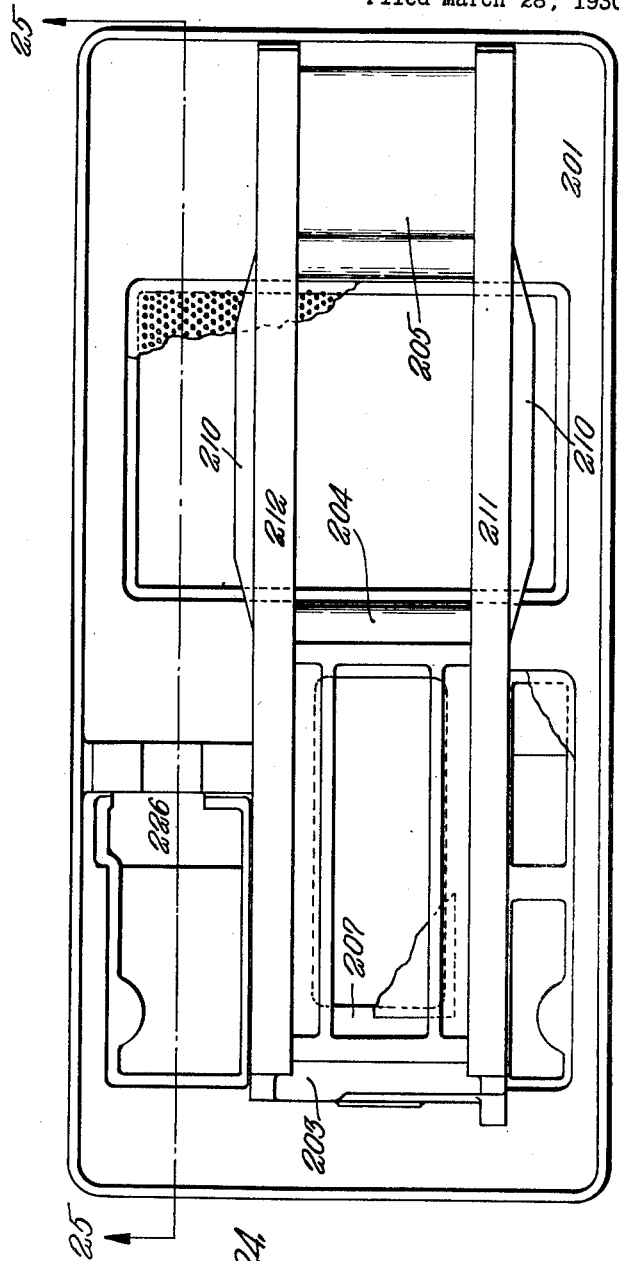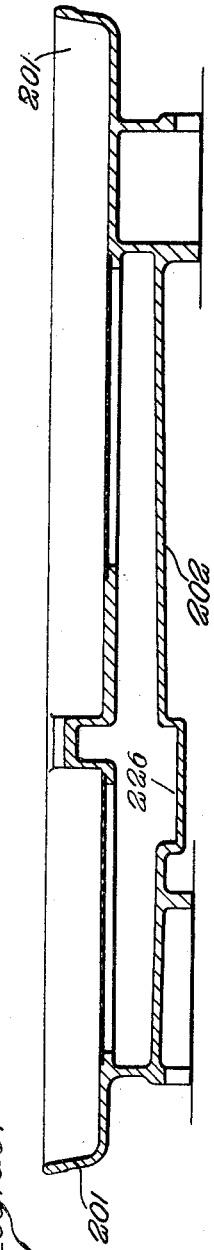

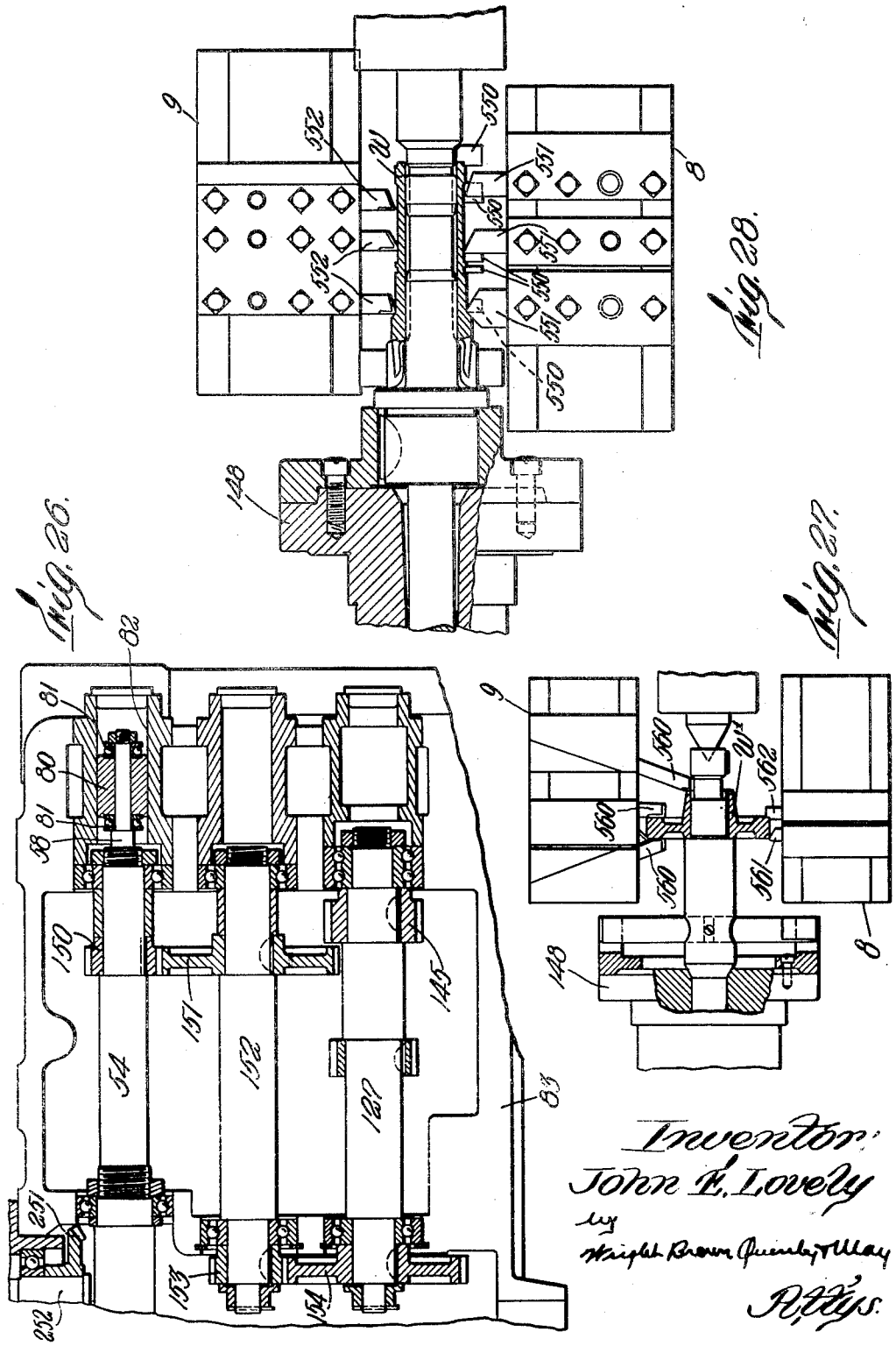

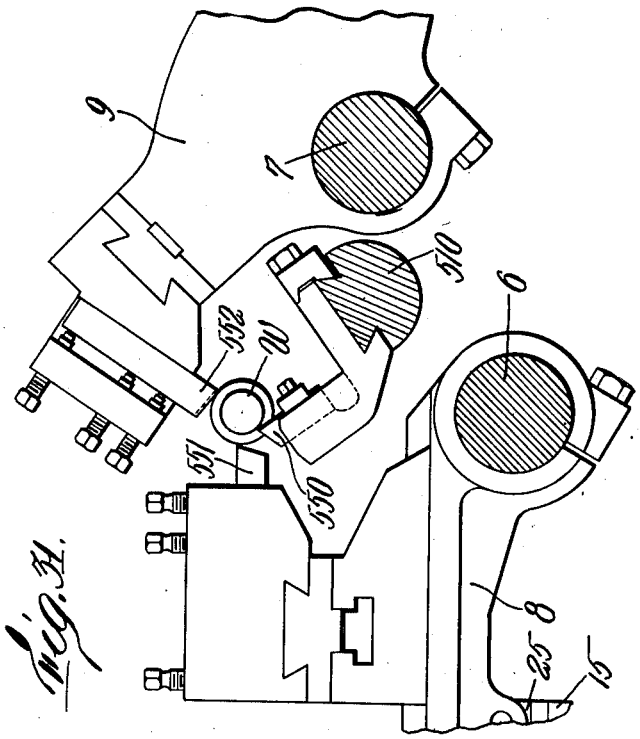
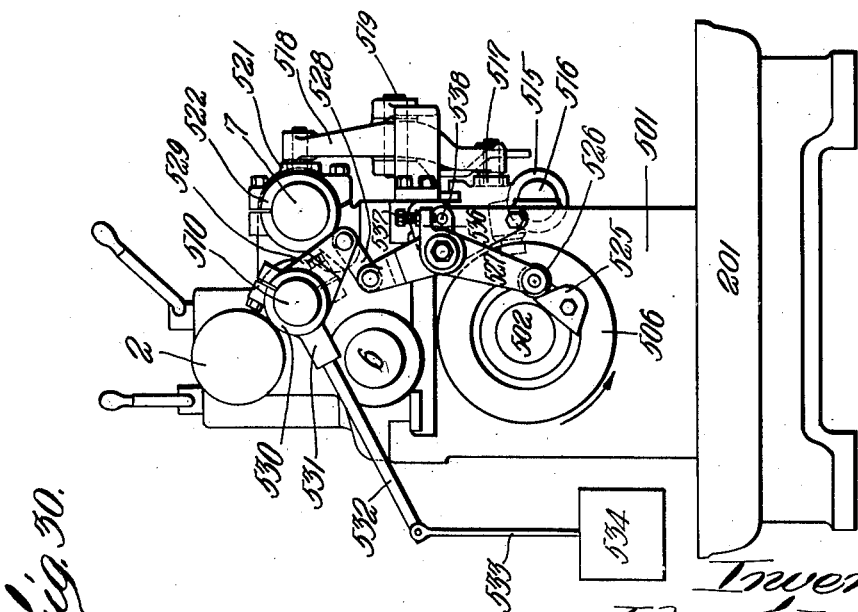

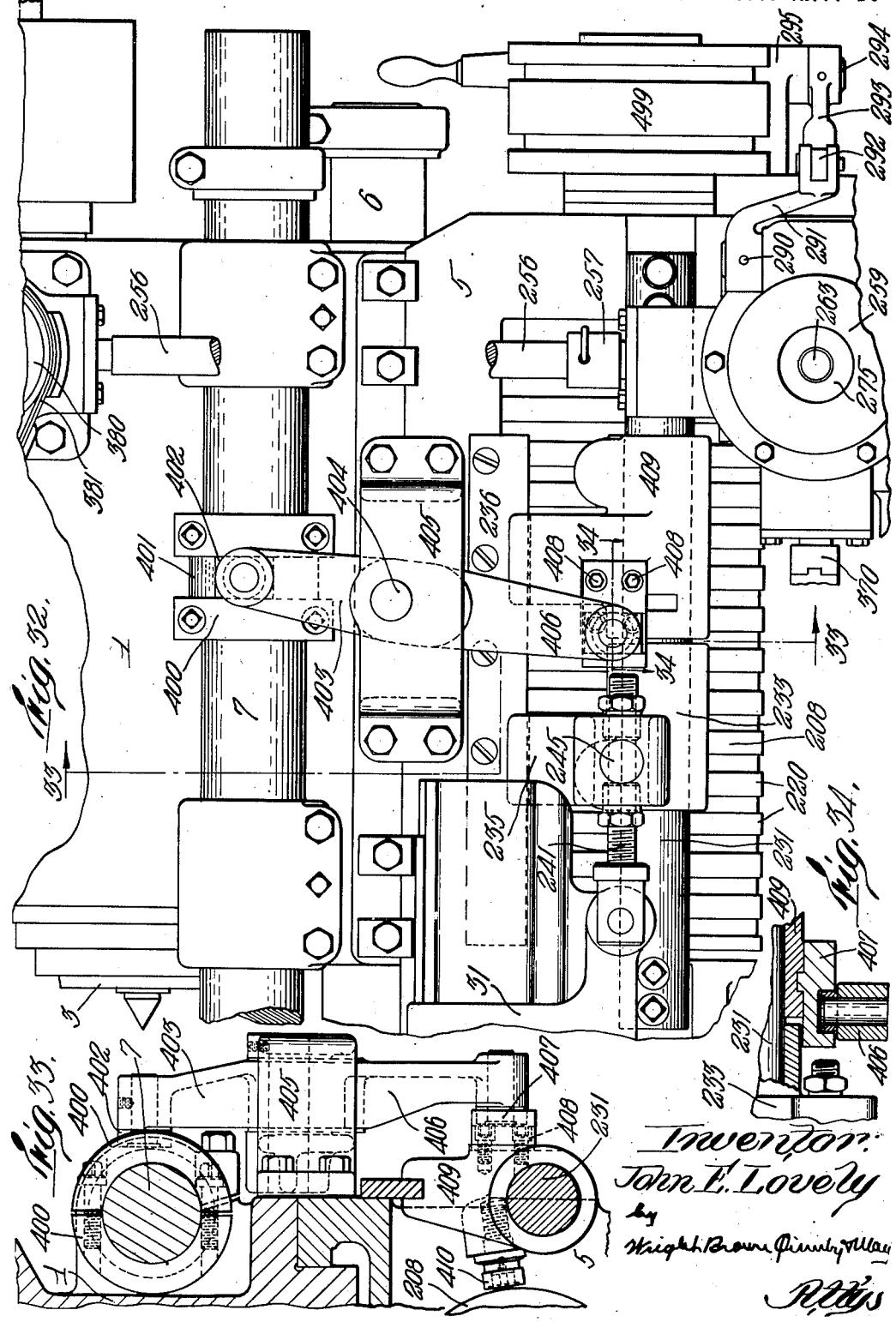

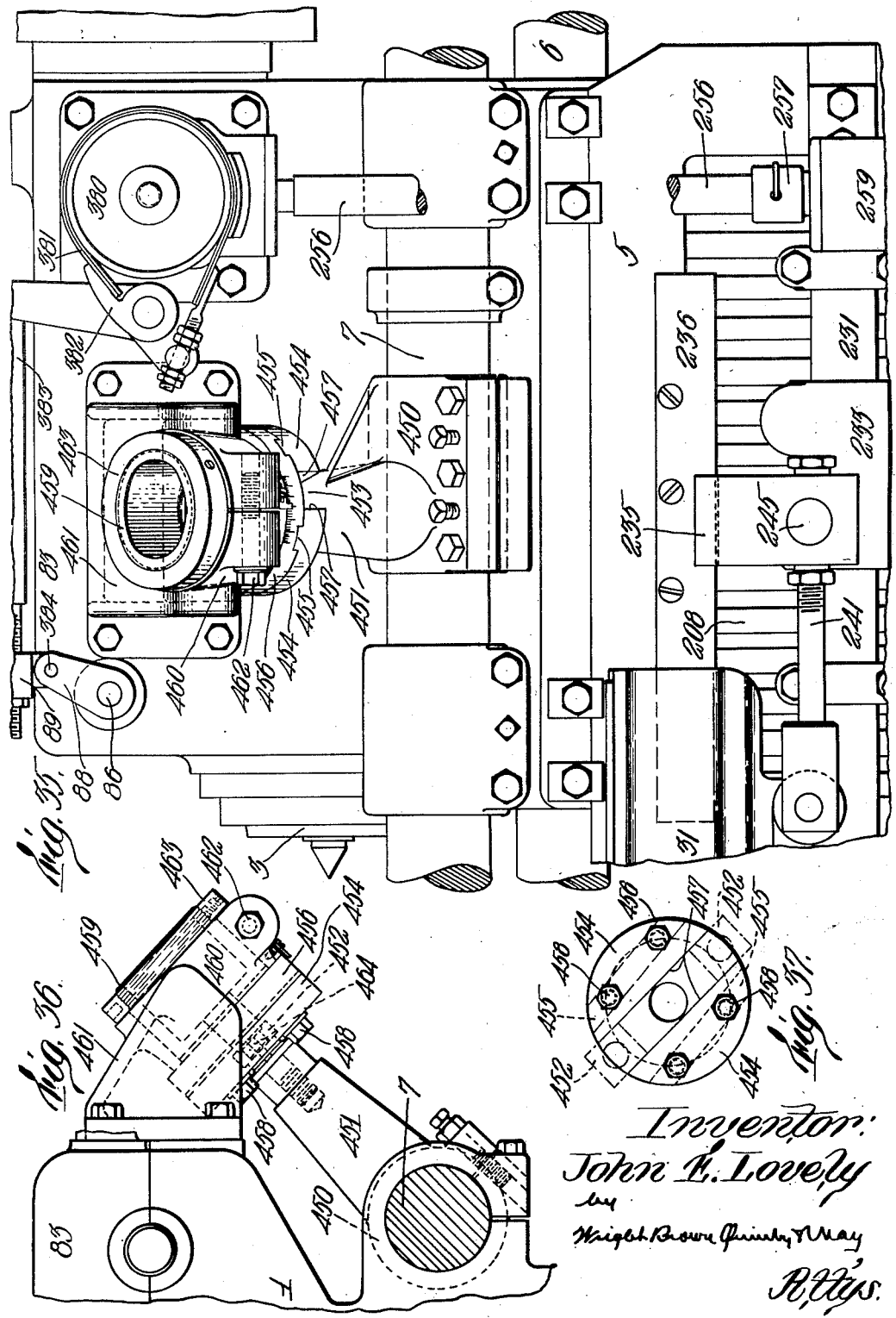

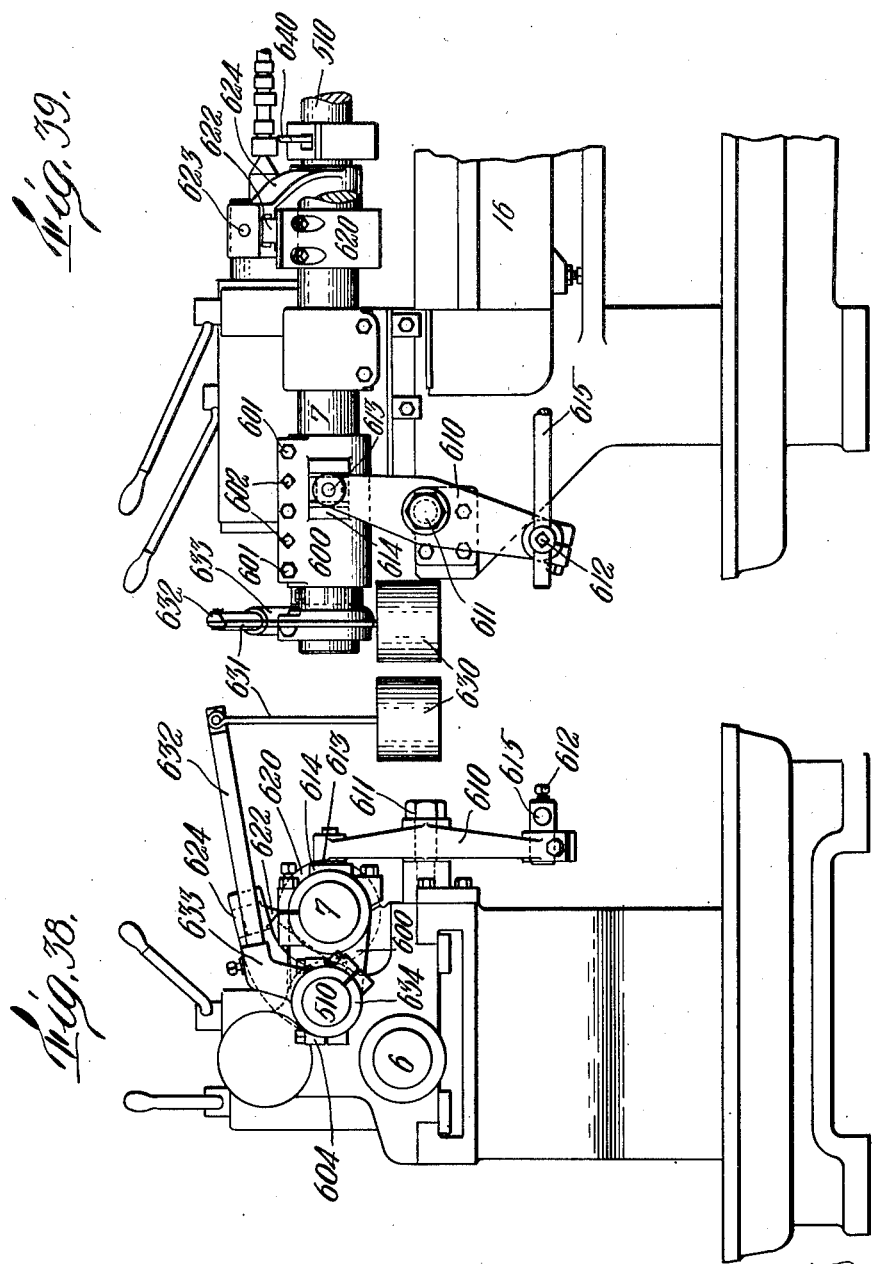

Aug. 22, 1933.  J. E. LOVELY  1,923,493
LATHE
Filed March 28, 1930   17 Sheets-Sheet 17

Inventor
John E. Lovely
by
Wright Brown Quinby & May
Attys.

Patented Aug. 22, 1933

1,923,493

UNITED STATES PATENT OFFICE 1,923,493

LATHE

John E. Lovely, Springfield, Vt., assignor to Jones & Lamson Machine Company, Springfield, Vt., a Corporation of Vermont Application March 28, 1930. Serial No. 439,625

27 Claims. (Cl. 82—2)

This invention relates to lathes, more particularly of the well known Fay type, which are provided with drums for supporting cams acting to control the motions of the various tools which perform the several operations on the work, and to otherwise control the cycle of operations of the machine.

One object of this invention is to materially reduce the floor space for a machine of a given size and capacity, and also to simplify and reduce the weight and cost of the machine. As heretofore constructed, the main cam drum is extended beyond the headstock of the machine. In accordance with the present invention, this cam drum is placed beneath one end portion of the machine, as under the headstock, the machine frame being provided with a box-shaped portion or chamber partly enclosing the drum, and being open vertically between the head and tailstock so as to provide a free space for the escape of chips. If desired, there may be provided space for one or more additional cam drums at or under the opposite end portion of the machine, and if desired, relatively short drums beyond the headstock and also beyond the tailstock, these additional drums providing for cam control of various parts such as auxiliary attachments wherever it is inconvenient or otherwise not feasible to derive such control from cams on the main drum.

Further objects are to improve various parts of the tool control mechanism and also certain of the driving mechanism.

For a more complete understanding of this invention, reference may be had to the accompanying drawings in which Figures 1 and 2 are front and rear elevations, respectively, of one form of the machine.

Figure 3 is a cross section on line 3—3 of Figure 2.

Figure 4 is an end elevation looking toward the headstock end of the machine.

Figure 5 is a section on line 5—5 of Figures 1 and 2.

Figure 6 is a fragmentary section to a larger scale showing the fast motion clutch illustrated in Figure 5, but in unclutching condition.

Figure 7 is a fragmentary section similar to a portion of Figure 5, but to a larger scale, showing the cam-actuating shaft brake.

Figure 8 is a detail section showing the shear pin.

Figure 9 is a view similar to a portion of Figure 7 but showing a modification.

Figure 10 is a detail section on line 10—10 of Figure 9.

Figure 11 is a horizontal section on line 11—11 of Figure 1 showing the clutch parts in high speed position.

Figure 12 is a detail section to a larger scale on line 12—12 of Figure 11.

Figure 13 is a view similar to Figure 12 but with the parts in low speed position.

Figure 14 is a perspective of a ratchet dog.

Figure 15 is a fragmentary vertical section on line 15—15 of Figure 1.

Figures 16 and 17 are detail sections on the correspondingly numbered section lines on Figure 15.

Figure 18 is a detail section on line 18—18 of Figure 3.

Figure 19 is a section to a larger scale somewhat similar to a portion of Figure 11, the clutch parts being in slow speed position and certain of the actuating parts being shown in elevation.

Figure 20 is a section similar to a portion of Figure 11, but to a larger scale and with the clutch in clutching position.

Figure 21 is a section on line 21—21 of Figure 20.

Figure 22 is a fragmentary longitudinal vertical section on line 22—22 of Figure 4.

Figure 23 is a view similar to a portion of Figure 22 but illustrating a modification.

Figure 24 is a top plan of the machine bed shown in Figure 22.

Figure 25 is a section on line 25—25 of Figure 24.

Figure 26 is a section similar to a portion of Figure 11 but illustrating a modification without speed change mechanism.

Figures 27 and 28 are details partly in section showing examples of work which may be done.

Figure 30 is a tailstock end elevation of the machine shown in Figure 29.

Figure 31 is a fragmentary vertical section on line 31—31 of Figure 29.

Figure 32 is a fragmentary rear elevation of a machine provided with a modified form of rear tool bar traversing mechanism.

Figure 33 is a section on line 33—33 of Figure 32.

Figure 34 is a detail section on line 34—34 of Figure 32.

Figure 35 is a rear elevation of a portion of the machine showing a taper turning attachment.

Figure 36 is a fragmentary end elevation of the mechanism shown in Figure 35.

Figure 37 is a detail plan of certain parts shown in Figures 35 and 36.

Figure 38 is an end view of a machine showing the use of an intermediate or auxiliary tool bar which is both rockable and axially movable.

Figure 39 is a fragmentary rear elevation of the machine shown in Figure 38 showing the rear and intermediate tool bar traversing and rocking mechanism.

Figure 1:
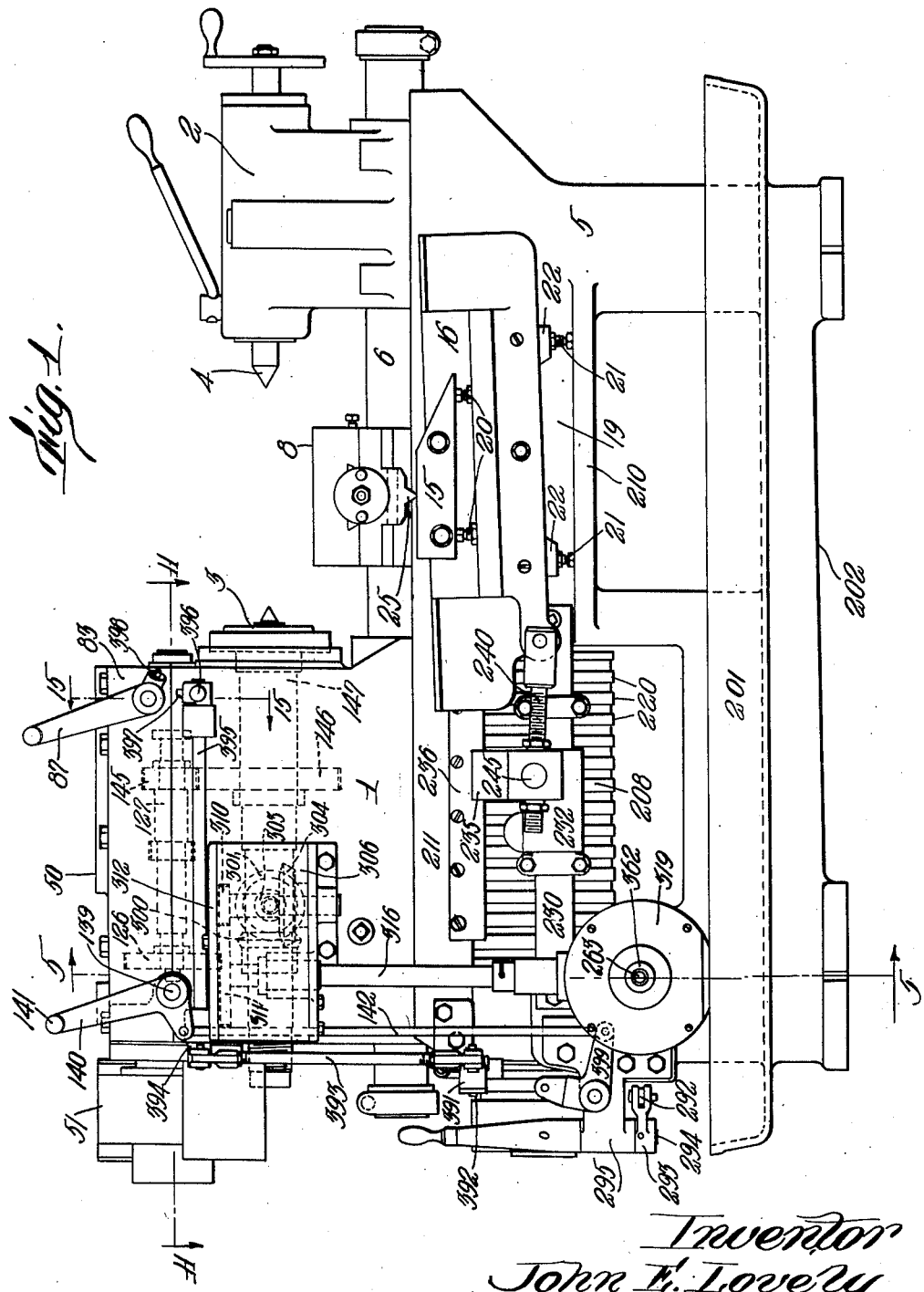
Figure 2:
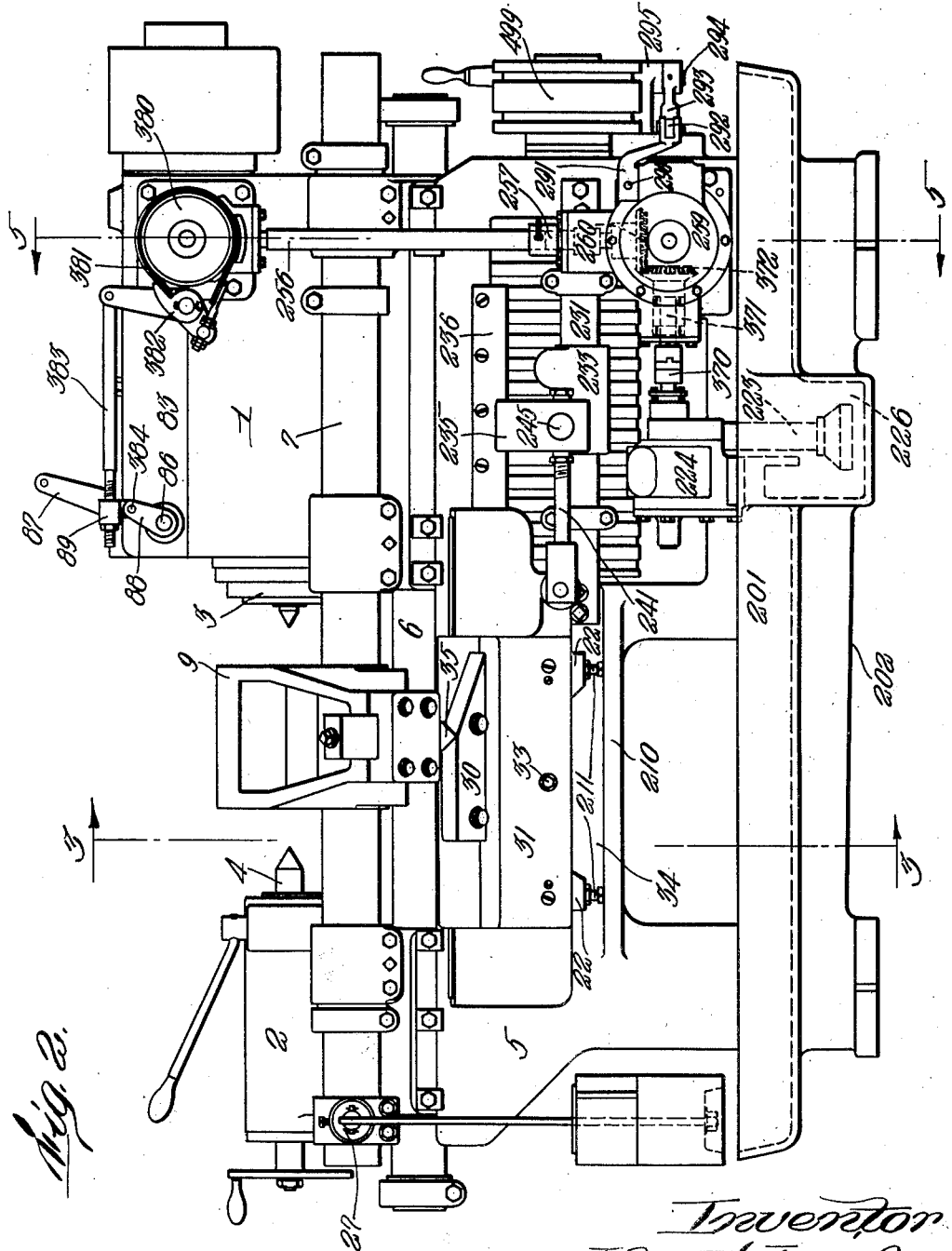

In general, the machine comprises a headstock, indicated more particularly in Figures 1 and 2 at 1, and commonly also provided with a tailstock 2, although for some classes of work the tailstock is unnecessary. The headstock carries a rotary spindle 3 to which work may be attached, and if a tailstock is used, this is provided with a mating center 4. Head and tailstocks are placed at opposite ends of a machine frame or base 5.

Extending beneath the work and lengthwise of the machine is shown the rockable and traversable tool bar 6 and back of this bar 6 and somewhat above it is a similar rockable and traversable tool bar 7 arranged as in the usual well known Fay lathe. The tool bar 6 is shown as carrying the front tool carrier 8 and the bar 7 is shown as carrying the rear tool carrier 9. The angular position of the tool bar 6 may be controlled by means of a former cam 15, which, as shown in Figure 1, is supported on a carrier 16 slidably mounted on a guide piece 17 (see Figure 3) which is shown as pivoted at 18 to a portion 19 of the side frame of the machine. This pivotal mounting of the guide piece 17 permits the carriage 16 to be adjusted angularly in a vertical plane for a purpose which will later more fully appear, and the former cam 15 may be mounted on the carrier angularly related thereto, adjusting or jack screws 20 being shown in Figure 1 for the purpose of determining this angular position. Likewise the carrier 16 may be fixed in its adjusted angular position by the adjusting screws 21 which bear on blocks 22 which support the carrier 16 at spaced points. The cam follower 25 at the outer end of the carrier 8 rests by gravity on the former cam 15. The angular position of the rear tool carrier 9 may be controlled by a former cam 30 adjustably carried by a slide 31 supported on a guide piece 32 pivotally at 33 to the rear wall portion 34 of the machine frame in a manner similar to the mounting of the front former cam. An adjustable follower 35 on the rear end of the arm 9 engages the follower cam 30 and is held thereagainst by any suitable means, such as a weight applied to the end of an arm 27 secured at one end to the bar 7. These follower cams may be moved longitudinally during the operation of the machine by means which will be more fully explained later. Likewise the tool bars may be reciprocated during the operation of the machine, as will more fully later appear.

*Spindle driving mechanism.*—The headstock 1 is shown as provided with a platform 50 on which a motor (not shown) may be supported and this motor may be belted to a drive pulley at 51, preferably a suitable idler pulley being employed to increase the areas of contact of the belt over the drive pulley 51 and the pulley of the motor shaft, and to maintain tension therebetween. As shown in Figures 11 and 20, this drive pulley 51 is mounted on suitable ballbearings 53 on a drive shaft 54 which extends lengthwise through the headstock at its upper portion. The shaft 54 may be clutched to the pulley 51 and for this purpose a multiple disk or ring clutch is shown at 55, alternate disks being carried by the hub 56 of the pulley and a sleeve 57 keyed to the shaft 54. The shaft 54 is hollow and has slidable axially therethrough a clutch actuating rod 58. This actuating rod is provided with a slot at 59 within which ride the inner ends of a pair of clutch dogs 60. Each of these clutch dogs is pivoted on a pivot bolt 61, as shown best in Figure 20, within a slot in a larger diameter portion 62 of the sleeve 57. Each of these dogs has a pair of cam portions 65, one of which faces a ring 66 engaging the inner of the clutch disks and forces these clutch disks together when the actuating rod 58 is moved to its right hand position as viewed in Figures 11 and 20. Figure 20 shows the actuating rod in this position while Figure 11 shows this rod in its right hand position where the cam portions 65 are out of engagement with the ring 66 and the clutch is in unclutched position. The sleeve 57 is permitted a slight longitudinal motion relative to the shaft so as to afford resilient pressure on the clutch disks, this resilient pressure being produced by one or more plugs 67 each seated in a socket in the sleeve 57 and spring pressed by a spring 68 into engagement with an abutment ring 69 having a portion engageable with the outer of the clutch disks or rings. The pulley 51 is suitably held against axial motion relative to the shaft as by the collar 70 fixed to the inner face of the hub of this pulley and engaging the raceway of the inner ballbearing 53, and a collar 71 engaging the outer ballbearing and held in position by a nut 72 to which access may be had through an opening 73 in the outer end of the hub 56. The clutch actuating bar 58 extends through the shaft 54 and at its opposite end from the pulley 51 has journaled on a reduced end portion thereof a block 80, ballbearings 81 being shown between the block and the rod 58 which rod rotates with the shaft 54. This block 80 is mounted for sliding motion in a passage 82 of the headstock cover gear casing 83 and has rack teeth cut in one face with which mesh the teeth of a pinion 85 (see Figure 15) keyed to a rock shaft 86. This rock shaft 86 extends transversely through the casing 83 and at its forward end has fixed thereto a starting lever 87. At the opposite end of the rock shaft 86 is fixed thereto an arm 88 to which is pivotally attached through a connecting member 89 a spring 90, the opposite end of which is fixed to the upper end of a bolt 91 projecting from the top of the casing 83. This spring tends to hold the shaft 86 rocked to the position which holds the block 80 in its right hand or unclutched position, as is shown in Figure 11. It may be moved and held in clutching position by means which will later be described. The shaft 54 has keyed thereto a pair of gears 90 and 91 of different diameters, the gear 90 being smaller than the gear 91. The gear 90 meshes with a gear 92 journaled on a shaft 93 and the gear 91 meshes with a gear 94 also journaled on the shaft 93. This shaft 93, as best shown in Figure 19, has a portion 96 of a large diameter and slotted through diametrically to permit pivotal mounting therein of a pair of clutch dogs 97 which may be brought into engagement at will with either of a pair of rings 98 and 99. In Figure 19 the clutch dogs are in engagement with the ring 98 and press this ring 98 so as to clutch the gear 92 to the shaft 93 through the friction clutch rings 100, thus to drive the shaft 93 from the gear 92 and thus at a relative slow speed due to the diametrical ratio between the gears 90 and 92. When the clutch dogs 97 are moved into engagement with the ring 99 in the position shown in Figure 11, the clutch connection between the gear 92 and the shaft 93 is released and the gear 94 is clutched to the shaft 93 through the multiple ring friction clutch 101 thus to drive the shaft 93 at a relatively high speed due to the larger diameter of the gear 91 which meshes with the gear 94. The clutch dogs 97 are moved to either their slow or high speed connections by means of an actuating rod 102 which passes axially through a portion of the shaft 93. It will be noted that the friction clutch 101 has a considerably greater number of rings than the clutch 100. This is for the reason that the high speed drive is alone through the rings 101, while the low speed clutching is effected not only through the friction rings 101, but also positively through a ratchet mechanism shown in detail in Figures 12, 13 and 14. At 105 is shown a ratchet wheel keyed to the shaft 93. A hub portion 106 of the gear 92 is provided with a recess at 107 within which is pivoted a ratchet dog 108 which may engage with the ratchet teeth, as shown in Figure 12, to couple the gear 92 positively to the shaft 93 for rotation in movable driving direction and this is the position of the parts when the gear 92 is in clutching relation to the shaft 93. In the high speed position of the parts when the clutch 100 is in unclutching condition and the clutch 101 is in clutching condition, the shaft 93 is driven faster than the gear 92 so that it overruns the ratchet mechanism, the dog riding up the inclined faces of the ratchet teeth into its recess 107 as shown in Figure 13. In order to prevent this dog from riding continually on the ratchet teeth in the high speed position, means are provided for yieldingly holding the dog out of engagement with the ratchet teeth in this position of the parts. This means comprises a split spring ring 109, the opposite ends of which engage opposite sides of a projection 110 on the dog, this ring 109 frictionally engaging the outer face of a hub extension 111 on the ratchet wheel beyond the ratchet, the rotation of the parts being such that when the speed of rotation of the shaft 93 is faster than that of the gear 92 the ring is dragged about in the direction of the arrow A on Figure 13, which tips the dog 108 out of engagement with the ratchet teeth and into the recess 107. The various parts carried by the shaft 93 are held against axial motion relative thereto by any suitable means. As herein shown this comprises a pair of collars 115 engaging threaded portions on the shaft 93, one of these collars butting against the outer end of the ratchet wheel 111 and the other butting against a collar 118, these collars 115 having inwardly turned peripheral flanges 120 having openings 121 therethrough at angularly spaced points to selectively receive a latch pin 122 spring pressed outwardly in a suitable socket in the ratchet wheel 111 and the collar 118. This latch pin engaging in any selected opening 121 prevents undesired accidental turning of the adjusting collars 115 but permits them to be turned as desired to compensate for wear of the parts. At one end of the shaft 93 it has keyed thereto a pinion 125 which meshes with a gear 126 on a shaft 127 arranged in parallel relation to the shafts 54 and 93. From this shaft 127 driving connections to the spindle, as will later appear, extend. The clutch actuating bar 102 for the shaft 93 has journaled on its outer end a block 130 similar to the block 80 on the shaft actuating rod 58. This block 130 has rack teeth cut therein, as shown best in Figure 19, and with these rack teeth mesh pinion teeth 132 formed on a sleeve 133 journaled on the rock shaft 86. The opposite end of the sleeve 133 is provided with pinion teeth as at 134 with which are engaged the teeth of a cylindrical rack 135. This, as shown best in Figure 16, is slidable in an opening 136 in the housing 83 and is connected at one end through a link 137 with an arm 138 fixed to a rock shaft 139. This rock shaft extends through the outer wall of the casing 83 and has fixed thereto a bell crank lever 140, one arm of which carries an actuating handle 141 and the other of which is pivoted to a rod 142 which extends to a suitable automatic actuating mechanism which will later be described. The driven shaft 127 hereinbefore referred to has fixed thereon a gear 145, which, as shown in dotted lines in Figure 1, meshes with a gear 146 fixed to the headstock spindle 147 (see Figure 18). This spindle 147 may be of usual construction, preferably supported in ball bearings as shown, and may be provided with any suitable means such as the nose shown at 148 for attachment of suitable work holding devices in accordance with the particular work to be operated upon. By reason of the friction clutch mechanism between the low speed drive gear 92 and the shaft 93 jumping ahead of the spindle when running at low speed is prevented. The ratchet mechanism alone would permit such jumping, if resistance to the turning of the spindle because of intermittent cutting should be suddenly released. By reason also of the friction clutch mechanism for the high speed driving connection with the ratchet mechanism the shaft is permitted to rotate at its higher speed as soon as the high clutch mechanism becomes sufficiently engaged to overcome any frictional engagement in the low speed friction clutch drive. Two speeds for the spindle are desirable in cases where the work has portions of greatly differing diameters and when it is desirable that the cutting speed of the tools be substantially constant. In work of this character, therefore, when the tools are operating on the portions of large diameter the low speed spindle drive will be employed, while when the tools are working on portions of small diameter, the high speed spindle drive will be employed. Where there are no such marked differences in diameter a single speed drive may be perfectly satisfactory. Such a single speed construction is shown in Figure 26 wherein the main drive shaft 54 carries a gear 150 which meshes with a gear 151 on an intermediate shaft 152, this shaft having another gear 153 thereon meshing with a gear 154 on a driven shaft 127. This shaft is provided with the gear 145 through which motion is transmitted to the spindle. In this construction the gears 153 and 154 may be change gears so that a suitable speed for the spindle may be produced and in the two speed drive shown in Figure 11, the gears 125 and 126 may likewise be change gears for a similar purpose.

*Tool bar control mechanism.*—As shown in Figures 1 and 2, the headstock of the machine is supported at one end of the machine frame 5. This machine frame, as shown in these figures, and also in Figures 22, 24 and 25, comprises a base portion having a marginal trough portion 201 extending therearound. Inwardly of the trough portion is an imperforate bottom wall 202, and three spaced upwardly extending hollow parallel wall members 203, 204 and 205. The walls 203 and 204 are under opposite end portions of the headstock 1 and defined between them a chamber 206 having a lower wall member 207 elevated above the bottom wall 202. This chamber is open from front to back of the machine and therein is a cam drum 208. This drum is pinned or otherwise fixed to a shaft 209 which is rotatably journaled in solid portions of the wall members 203 and 204. In the form of machine disclosed in Figures 1, 2 and 22, this shaft 209 extends through and outwardly of the wall member 203 but stops at about the outer face of the wall 204. The walls 204 and 205 are joined together by the integral front and back wall members 19 and 34, respectively, which have heretofore been described as pivotally supporting the guide members 17 and 32 for the front and back former slides. These front and back wall members may be provided with outwardly extending flanges 210 which not only strengthen these members but form ledges for supporting the adjusting screws 21 for the former slide carriers. The upper portions of these wall members 19 and 34 merge with top rails 211 and 212 (see Figure 24) which also connect the upper portions of the wall members 203 and 204 and form supports for the head and tailstocks 1 and 2. It will be noted that the walls 19 and 34 are spaced apart, there being no frame obstruction between them and between the confronting faces of the walls 204 and 205. They thus form a space to receive the chips from the work, which is supported for rotation with the headstock spindle thereabove. The tool bar 6 extends across this space but, as will later more fully appear, it carries no cam mechanism within this chip space. The bar 7 is substantially directly above the side wall 34 so that it does not encroach on the chip space.

The tool bar 6 may be given its axial motion from suitable cams fixed to the outer face of the cam drum 208 and as shown in Figures 5 and 22 the bar 6 has journaled thereon a sleeve 215 which carries a suitable cam follower 216 in position to be acted upon by cam pieces (not shown) which may be secured to the outer face of the cam drum 208. As shown in Figure 5, this sleeve 215 has extending therefrom an arm 217, the end of which rides in a guideway 218 between portions of the rear side frame, this construction holding the sleeve 215 from rocking motion with the tool bar 6 so that its follower 216 is held in proper relation to the cams on the cam drum 208. This cam drum is shown as provided with peripheral ribs 220 on which the cam pieces may be secured by suitable bolts passing through holes in the cams and in the drum as in the well known Fay lathe. By locating the cam drum 208 beneath the headstock it is protected from access of chips due to the operation of the tools on the work and is also brought out of the way so that its presence does not increase the over-all length of the machine over the extreme dimensions of the head and tailstocks. Moreover, by placing it in this position the tool bar 6 may receive its axial movements by means of cams placed on the outside of the drum which is a considerable advantage over the Fay lathe construction in which the cam drum is positioned relative to the tool bar so that the tool bar must receive its axial motions from internal cams. Internal cams are difficult to apply and properly adjust. One or both of the walls 19 and 34 connecting the frame portions 204 and 205 has its lower edge spaced considerably above the bottom wall 202 of the frame and above a perforate base portion 225 which forms a strainer to permit the coolant to pass to the bottom wall 202 while retaining the chips thereabove. This relation of the parts permits ready access to be had for the removal of the chips from the chip space on the member 225. This portion is slightly below the lower edge of the trough 201 so that the coolant caught in these trough spaces may flow to this perforate member and pass to the bottom of the machine, the bottom wall being formed to direct the coolant to a sump shown at 226 (Figures 2 and 24) within which extends the intake pipe 223 of a pump 224 shown best in Figure 2. On either side of the cam drum may be mounted guide shafts 230 and 231, respectively, on which are slidably mounted follower carriers 232 and 233, respectively (see Figures 1, 2 and 5). Each of these follower carriers is shown as provided with an upstanding forked arm 235 which bears on opposite sides of a frame piece 236 secured as by screws to the main frame of the machine. The engagement of these arms 235 with the pieces 236 acts to hold the cam follower carriers 232 and 233 against rocking motion relative to their supporting bars 230 and 231 so as to maintain cam followers 237 thereon in proper relation to cam pieces which may be fixed to the outer face of the cam drum 208 in a different position axially thereof than the cams for controlling the axial motion of the bar 6. These follower carriers may be secured through suitable adjustable rods 240 and 241 to the former cam carriers. Preferably these rods are secured to suitable blocks pivoted as on the pins 245 so that they may actuate the former cam carriers without binding when these are mounted angularly disposed to the horizontal. These two cam follower members 232 and 233 thus control the axial positions of the tool bars 6 and 7, the followers on their respective tool carriers being held against the former cams by weighted arms or other similar means as in the well known form of Fay lathe. Other cams may be placed on the cam drum 208 as desired to produce the desired motions of any auxiliary attachments to the machine which it may be desired to use in the manner similar to that heretofore employed in connection with the well known Fay lathe.

Means are provided for driving the cam drum 208 and as shown such means comprises a two-speed drive mechanism, both speeds being effected through shafts and gearing without recourse to belts. The high speed drive is effected directly from the main drive shaft from which the spindle is driven. To this end the shaft 54 is provided with a beveled gear 250 with which meshes a beveled gear 251 (see Figures 5 and 11) fixed to a horizontal shaft 252. This shaft extends through a casing portion 253 and has keyed thereto a bevel gear 254 within this casing. This gear 254 meshes with a beveled gear 255 fixed to a vertically extending jack shaft 256 on the back of the machine at the headstock end. The lower end of this shaft 256 is coupled as by a coupling 257 to a vertical shaft 258 journaled in a casing 259 at the lower portion of the machine. This shaft 258 has on its lower end a bevel gear 260 which meshes with a bevel pinion 261 on a sleeve 262 journaled on a worm shaft 263 which extends across the machine beneath and at right angles to the axis of the cam drum and which carries a worm wheel 264 meshing with worm teeth 265 cut in one end portion of the drum, as shown best in Figure 22. The sleeve 262 may be clutched to the shaft 263 to rotate the same as by means of a friction clutch mechanism shown generally at 270 which is housed within the casing 259. This friction clutch mechanism comprises multiple friction rings or disks 271 which may be brought into frictional contact by pressure of a ring 272 thereagainst. This ring may be engaged by a plurality of dogs 273 pivoted to a sleeve 274 keyed to the shaft 263. The sleeve 274, as shown best in Figure 6, is held on the shaft 263 by means of a nut 275 having a plurality of holes 276 therethrough within any of which may be engaged the spring latch pin 277 to hold this nut in adjusted position. One or more spring pressed plugs 278 reacting against a ring 279 pinned to the shaft 263, as by the pin 280, tend to hold the sleeve 274 against the face of the nut 275. Slidable on the outer face of the sleeve 274 is a second sleeve 285 having a peripheral groove 286 therein for the reception of rollers or shoes 287 of a shift yoke 288. The sleeve 285 has an extended annular flange portion 290 which when in the position shown in Figure 6 in the clutch-released condition is moved to the left permitting the dogs 273 to swing outwardly under the action of centrifugal force to release their pressure against the friction ring 272. By throwing the shift yoke 288 to the right, as shown in Figure 5, the flange 290 rides up the inclined outer faces of the dogs 273, thus swinging them toward the center of the shaft 263 and causing them to bring the friction rings into clutching engagement. This shift yoke 288 is pivoted on a vertical shaft extending through the casing 259 to which is pinned as at 290 (see Figure 2) an arm 291. As shown best in Figures 2 and 4, the arm 291 is connected through a link 292 to an arm 293 at the lower end of a rock shaft 294. To the upper end of this rock shaft and above its bearing 295 is fixed a member 296 which has a cam follower 297 positioned to be engaged at suitable times by a pair of cam blocks 298 and 299 (see Figure 22) carried by a drum 499 fixed to the end of the cam drum shaft 209 outwardly of the frame portion 203. By this means the clutch for connecting the cam drum drive shaft 263 to the high speed jack shaft 256 may be operated in time with the rotation of the cam drum shaft 209 to drive the cam drum at a relatively high speed or to permit it to be driven when the clutch is in unclutched position by the slow speed drive. This slow speed drive derives its motion from the work spindle in the manner shown best in Figure 18. This work spindle has fixed thereto a bevel gear 300 which meshes with a bevel gear 301 on a short horizontal shaft 302. The outer end of this shaft carries a bevel pinion 303 which meshes with a bevel gear 304 on a vertically arranged shaft 305. As shown best in Figure 3, the gear 304 is positioned at the lower end of the shaft 305 which is journaled in a housing 306 secured to the forward face of the headstock gear casing 83. Adjacent to its upper end it carries, as shown in Figure 1, one of a gear of change gears 310 and 311, access to which may be had through an opening normally closed by a removable cover 312 for the top of the housing 306. This change gear 311 is fixed to a shaft 315 supported and journaled in the casing and keyed to the slow speed vertical jack shaft 316, as shown best in Figure 5. This jack shaft is connected through a coupling 317 to the upper end of a vertical shaft 318 journaled in a casing 319 enclosing the opposite end of the shaft 263 from the high speed clutch mechanism. The shaft 318 is held in its position by means of the coupling 317 which includes in its connection to the jack shaft 316 a frangible shear pin 320 in order that the parts may be operatively disconnected by shearing of this pin should undue resistance be encountered in the movement of the drum. Likewise the coupling 257 for the jack shaft 256 may include such a pin.

Figure 8 illustrates in detail a construction of such a coupling in which there is a cup-shaped member 325 coupled by a pin to the upper end of the shaft 318, this member 325 supporting the shaft 318 against downward movement by its engagement with the upper end of the shaft bearing. The shaft 318 is provided with a transverse opening containing a bushing 326 through which the shear pin 327 extends and a semi-circular spring 328 engages about the member 325 with its inturned ends extending into openings 329 in the member 325 and bearing against the ends of the shear pin. This shear pin is thus retained removably in position.

The lower end of the shaft 318 carries a bevel pinion 330 which meshes with a bevel gear 331 journaled on the shaft 263 and adapted to be connected to rotate this shaft by means of an overrunning clutch mechanism indicated generally at 332 and which may be of the same type as that shown in Figures 11, 12 and 13 for connecting the low speed gear 92 with the intermediate spindle transmission shaft 93. By this means when the clutch mechanism for the high speed jack shaft 256 is out of operation, the shaft 263 is driven at a lower speed from the low speed jack shaft 316, and when the clutch is in clutching position the high speed jack shaft 256 becomes operative to drive the cam drum, overrunning the low speed gear 331 by reason of the ratchet mechanism.

In order that when the clutch is thrown out, the shaft 263 may immediately slow down to the low speed, it is preferable to employ a retarding device for this shaft. Two forms of such device for this shaft are indicated in Figures 7 to 10. In Figure 7 a brake drum 340 is shown as keyed to the shaft 263 and bearing on its outer periphery is a band of frictional material 341 which is held by a ring 342 surrounding the drum 340 and having a foot portion 343 adapted to project into a pocket 344 in the bottom portion of the gear casing 319. In Figures 9 and 10 a modified brake construction is shown in which there is employed a ring 350 keyed to the shaft 363, this ring being provided with a radially extended flange 351. At opposite faces of this flange are shown rings of friction material 352 which are pressed against opposite faces thereof. The means for effecting this pressure comprises a pair of ring members 353 and 354, the ring flange 351 being rotatable therebetween. These rings 353 and 354 are arranged to remain stationary and for this purpose, one of them, such as the ring 354, is provided with a lug 355 which is positioned between two stop lugs 356 integral with the gear casing 319 and similar to the construction illustrated in Figure 7. This ring 354 is also provided with lateral extensions forming housings 357 to receive the head end portions of spring pressed screws 358. These screws are threaded into the ring 353 and thus act to hold this ring 353 against rotation with the ring 350. Springs 359 reacting between the bases of the housings 357 and the heads 360 of these screws act to pull the rings 353 and 354 toward each other, thus to compress the frictional material against the faces of the flange 351. In either of the constructions herein shown the rotatable element which is keyed to the shaft 263 is held in position thereon as by the threaded collar 362, and the end 363 of the shaft 263 extending therebeyond is preferably formed polygonal, as shown, to receive a suitable crank for hand actuation of the shaft 263 which may be desired when setting the machine for a particular operation and so as to position the cam drum as desired for attaching or removing cam pieces therefrom.

The coolant pump 224 may conveniently be driven from the high speed jack shaft 256 and for this purpose its shaft is shown in Figure 2 as connected through a coupling 370 with a shaft 371 having a bevel gear 372 thereon which meshes with the gear 260.

It is desirable that as soon as the stop lever is actuated, the rotating mechanisms should be quickly stopped. For this reason the shaft 252 is shown as provided with a brake drum 380 about which passes a brake band 381 which is tightened as through a lever mechanism 382 by means of a rod 383 adjustably and pivotally connected at 384 to the arm 88 fixed to the rear end of the starting and stopping lever rock shaft 86, as shown best in Figure 2. The machine may be automatically stopped also by action of the cams controlled by the rotation of the cam drum shaft 209. In Figure 22 such a stop cam is shown at 390 which at a suitable point in the rotation of the drum and after the completion of the desired cycle of operation, engages a follower on a lever 391 (see Figure 4) fulcrumed at 392 and having its opposite end operatively connected to the lower end of an upright rod 393, the upper end of which is pivoted to an arm 394 fixed to a rock shaft 395. This rock shaft 395, as shown in Figure 1, extends horizontally along the forward face of the transmission casing 83 and has at its inner end an arm 396 provided with a latch piece 397 engageable with a similar latch piece 398 carried by a projection on the starting lever 87 (see also Figure 15). When the shaft 395 is in operative position the latch 397 is so placed that when the starting lever is thrown to starting position, the latches 397 and 398 interengage and prevent the spring 90 from throwing the starting lever to stopping position. As soon, however, as the stop cam engages and moves the lever 391 this shaft 395 is rocked to move the latch 397 out from engagement with the latch 398, thus permitting the starting lever to thow to stopping position and stop the machine. The rod 142 for controlling the spindle speed change mechanism may also be actuated from cams on the drum 499 which act on a suitable follower carried by the bell crank lever 399 (Figure 1) to which the rod 142 is pivotally connected.

*Modified mechanism for traversing the rear tool bar.* In Figures 32 to 34 a somewhat different mechanism for imparting the traverses to the rear tool bar is shown. Referring to this figure, the back tool bar is shown at 7 and has fixed thereto a pair of semi-spool shaped collars 400 which together define an annular grooved way 401 within which may ride a shoe 402 pivoted to the upper end of a lever 403. This lever is fulcrumed at 404 on a bracket 405 fixed to the rear face of the machine frame and the lower end of this lever 406 engages pivotally in a block 407 which is secured as by screws 408 to a cam follower carrier 409 similar to the cam follower carrier 233 which is employed to actuate the rear former cam, and which is mounted to slide on the same carrier bar 231. This follower carrier 409 is provided with a follower 410 for actuation by suitable cam elements secured to the outer face of the cam drum 208.

*Taper turning mechanism.*—In Figures 35 to 37 a construction by which the rear tool bar 7 may be given simultaneous traverse and rocking motions in order to cut taper is illustrated. As therein shown the bar 7 has clamped thereon a collar 450 provided with an upwardly and outwardly extending arm 451. On the upper and outer end of this arm is secured a cam follower 452 which is adapted to ride in the space 453 between a pair of spaced segmental guide pieces 454. These segmental guide pieces are provided with tongues 455 which engage in mating grooves in a disk member 456. These grooves are arranged slightly angularly with relation to the cam guiding faces 457 of the segmental blocks 454 so that by adjusting these segmental blocks axially of their ribs 455, the spacing between the segmental blocks may be adjusted to take up wear, or for other desired purposes. The segmental blocks when in proper position are adapted to be fixed therein by bolts 458 passing through enlarged openings in the segmental blocks and threaded into the disk 456. This disk has a hollow cylindrical hub portion 459 which may be clamped in any desired angular position with a split clamping ring 460 carried by a bracket 461 fixed to the casing 83. It may be locked in the desired angular position by means of a locking bolt 462 threaded in one of the side portions of the split ring and extending through the opposite portion against which its head bears. The outer end of the hub portion 459 may be externally threaded for the reception of an internally threaded retaining collar 463 and centrally both the hub portion and the disk 456 may be apertured in order that access may be had by a suitable tool to the securing bolt 464 for the cam follower 452. As the tool bar 7 is reciprocated by any suitable mechanism, as on the cam drum as heretofore described, it also has imparted thereto a rocking motion dependent in amount on the angular position of the segmental blocks 454 thus to determine the amount of taper cut by the tools.

*Machine modifications for various attachments.*—In some cases, particularly where various attachments are desired to be put on the machine for adding to the number of operations which may be performed simultaneously thereon, it is necessary to employ a third rocking or axially movable tool bar, or in some cases both of these motions may be required. In such cases it may not be convenient, or perhaps even possible, to derive the various controls for such attachments from the cam space available on the cam drums positioned beneath the headstock. Where this is the case, an additional cam drum may be provided positioned at the tailstock end of the machine, as illustrated, for example, in Figures 23 and 29 to 31, but when this is done the chip space should be entirely free from cam mechanisms in order to avoid the possibility of interference, by reason of the presence of foreign material between the cams and followers, with the desired control of the various tools and attachments by the cam means.

Figure 29:
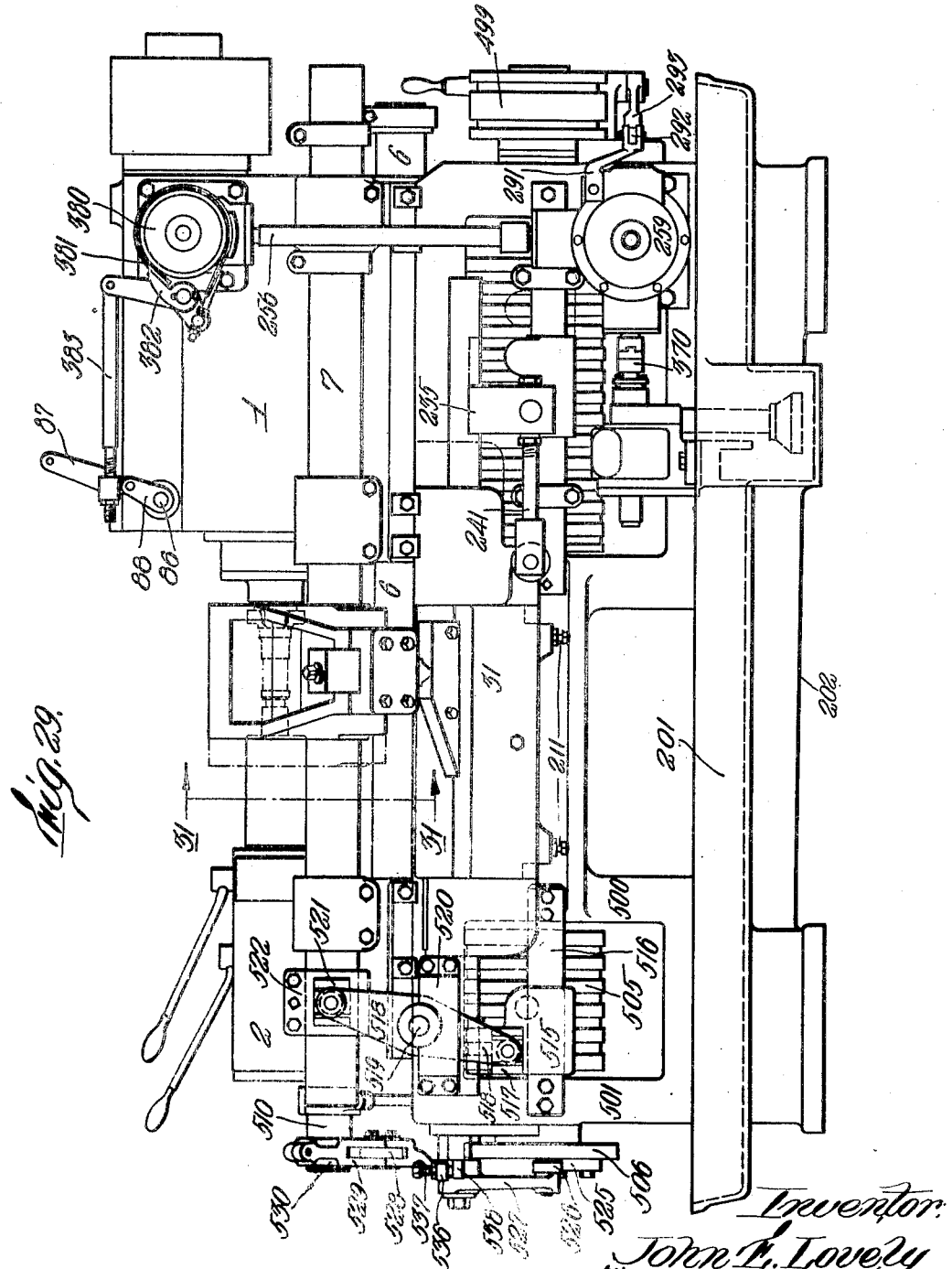
Figure 29 is a rear elevation of a machine employing the modified frame shown in Figure 23 and particularly suited to do work such as is shown in Figure 28.

In Figures 28 and 29 a two-part upstanding frame portion at the tailstock end of the machine is shown in place of the single upstanding frame portion 205 shown, for example, in Figure 22. These two-spaced upstanding frame portions are indicated at 500 and 501 and the cam drum shaft 502, which is journaled in each of the upstanding wall portions 203, 204, 500 and 501 is employed in place of the relatively short cam drum shaft 209 heretofore described. Between the wall portions 203 and 204 a cam drum, such as 208, may be supported in the manner heretofore illustrated and a starting and speed control cam drum 499, as shown in Figure 22, may be employed. Additional cam drums, however, may be attached to the shaft 502, one of these shown at 505 in Figure 29, being fixed to the shaft 502 between the wall portions 500 and 501 and an additional cam mechanism shown at 506 may be carried by the end portion of the shaft 502 which projects beyond the wall portion 501. In addition to the tool bars 6 and 7, as heretofore employed, a central auxiliary bar may be used positioned as shown at 510 in Figures 30 and 31 with relation to the bars 6 and 7. The back tool bar 7 may be given its reciprocating and rocking motions as heretofore described, if desired, but as shown in Figure 29 its traversing or reciprocating motions are derived from suitable cam pieces secured to the cam drum 505. For this purpose a cam carrier member 515 is slidably mounted on a guide bar 516 extending across between the wall members 500 and 501 and has a suitable cam follower which may be engaged by cam pieces fixed to the drum 505. This follower carrier 515 is shown as having a vertically extending guide portion 517 for slidably guiding a follower on the lower end of a lever 518 fulcrumed at 519 on a bracket 520 secured to the side face of the machine. The upper end of this lever 518 engages a grooved guide block 521 secured to a collar 522 which may be clamped to the bar 7. This rocking motion of this bar 7, as shown in these figures, is controlled by the rear former cam, as heretofore described. The auxiliary or center tool bar 510, as herein shown, is mounted for rocking movement only and this rocking movement is shown as effected from the cam member 506. This member carries a cam piece 525 which may engage a follower 526 on a bell crank lever 527, the upper arm of which is connected through a pivoted link 528 with an arm 529 having a split collar portion 530 clamped to the end of the tool bar 510. As shown in Figure 30, this collar 530 has an extension 531 to which is fixed a rod 532 to the outer end of which is suspended by a link 533, a weight 534 which holds the bell crank lever 527 with a portion 536 thereof having a stop screw 537 in engagement with a stop 538, until the bell crank lever is removed from this position by engagement of the cam piece 525 with the follower 526. The former slide for the rear tool bar 7 and the controls for the axial and angular position of the tool bar 6 may be controlled from cams under the headstock as previously described.

By the presence of the additional tool bar 510 a set of facing tools 550 positioned to face shoulders positioned at various places along work, such as is indicated in Figure 28 at W, may be employed in addition to roughing tools 551 carried on the front tool carriage 8 and finishing tools 552 carried by the rear tool carriage 9. Thus the work may be rough and finish turned axially to form a series of portions of different diameters separated by shoulders and the shoulder portions may be faced all in a single cycle of operations of the machine. By the use of former cam ways tilted from the horizontal, the tools carried by the front and back carriers may be relieved from the work at the ends of their cutting traverses by slight axial movement of the former cam carriers to lower the former cams to permit the weights to rock the tool bars in tool-retracting directions.

In Figure 27 a somewhat simpler character of work is illustrated, the work being shown at W' and wherein but two tool carriers are necessary, the rear tool carrier having facing tools 560 and the forward tool carrier having turning and edge chamfering tools 561 and 566, respectively. Work of the character shown in Figure 7 may be done readily on the machine having the cam drums only under the headstock.

In Figures 38 to 41 a further modification of the machine is shown in which the additional or auxiliary tool bar 510 is given axial as well as rocking motions. Referring to these figures, the back tool bar 7 is shown as having slidably mounted on its rear end portion a sleeve 600. This sleeve is shown as split, the split portions being engaged by clamping bolts 601 and spacing bolts 602 so as to adjust it to the desired close but sliding fit on the bar 7. This sleeve 600 has a lateral extension 603 in which the auxiliary bar 510 is journaled. On opposite sides of this extension 603 are split collars 604 which are clamped to the bar 510 so as to prevent relative axial motion of the extension 603 and the bar, so that the position of the sliding sleeve 600 on the bar 7 determines the axial position of the auxiliary bar 510. The sliding sleeve 600 is shown as controlled in its position axially of the bar 7 by a lever 610 pivoted at 611 to the machine frame, its upper end carrying a block 613 engaging between guide portions 614 on the slide 600 and having pivotally connected at its lower end, as at 612, an actuating rod 615 which may extend to suitable cams (not shown) on the cam drum positioned beneath the headstock of the machine. Or where the machine is provided with cam drums under both the head and tailstocks, it might, of course, be controlled by cams on the cam drum under the tailstock if desired.

The angular position of the bar 7 may be controlled by the use of a former slide, a portion of the carrier 16 of which is shown in Figure 39, as heretofore described, and the angular position of this bar 7 may be used to control the angular position of the auxiliary bar 510. To this end the bar 7 is shown as having clamped thereto a split collar 620 having one side portion cut away to form a cam face as at 621, shown best in Figure 41. Bearing on the outer face of this collar is a cam follower 622 mounted on a pin 623 at the rear end of an arm 624 which has a split collar portion 625 clamped tightly to the auxiliary bar 510. The cam follower or shoe 622 is held down against the collar 620 by any suitable means such as a weight shown at 630 suspended through a link 631 from an arm 632, the forward end of which is secured in a bracket 633 clamped to the auxiliary bar 510, for which purpose it is shown as provided with a split collar portion 634 engaging this bar.

Figure 41:
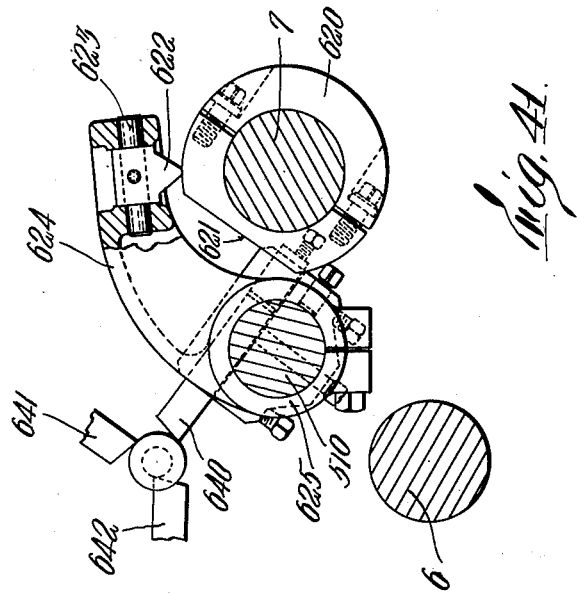
Figure 41 is a fragmentary section on line 41—41 of Figure 40.
Figure 40:
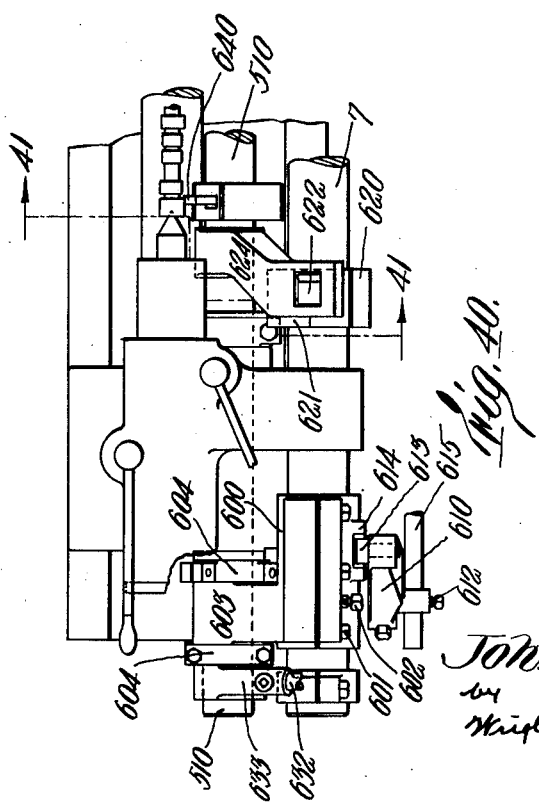
Figure 40 is a top plan of the portion of the machine shown in Figure 39.

As will be clearly apparent from an inspection of Figure 41, when the shoe 622 is riding on the circular periphery of the collar 620, the tool shown at 640 is held up to the work as during a working traverse, while on rocking of the bar 7 to the right, as shown in this figure, permitting the shoe 622 to ride on the portion 621 of the collar 620, the tool 640 will be retracted from the work, thus relieving it for a return traverse. With this arrangement of parts the tool 640 may be used to produce traversing cuts on the work, either roughing or finishing cuts as may be desired, the back tool shown at 641 in Figure 41 being employed either for the finishing or roughing traversing cut, or for a facing cut as may be desired, and the forward tool 642 for forming some other desired operation, such as a roughing or finishing traversing cut or a facing cut.

From the foregoing description of certain embodiments of this invention, it should be evident to those skilled in the art that various changes and modifications might be made without departing from the spirit or scope of this invention as defined by the appended claims.

I claim:

1. A machine of the class described comprising a frame having a closed bottom wall end portions upstanding therefrom, at least one of said end portions including a chamber having end walls, spaced front and back walls connecting said end portions and defining therewith a chip space, said chip space having a perforate base spaced above said bottom wall to retain chips while permitting coolant to pass to said bottom wall, means for holding work and a tool in operative relation above said chip space, and cam means contained in said chamber and closed off by one of said end walls from said chip space for controlling the relative positions of said tools and the work.

2. A machine of the class described comprising a frame having a closed bottom wall, end portions upstanding therefrom, at least one of said end portions including a chamber having end walls, spaced front and back walls connecting said end portions and defining therewith a chip space, said chip space having a perforate base spaced above said bottom wall to retain chips while permitting coolant to pass to said bottom wall, means for holding work and a tool in operative relation above said chip space, a wall forming the bottom of said chamber spaced above said bottom wall, and cam means contained in said chamber and closed off by one of said end walls from said chip space for controlling the relative positions of said tools and the work.

3. A machine of the class described comprising a frame having a base, end portions upstanding from said base, at least one of said end portions including a chamber having end walls, and said end portions defining therebetween a chip space, means for supporting work and a tool in operative relation above said chip space, a shaft extending through said chamber and journaled in said end walls, a drum carried by said shaft, cam means carried by said drum, and means controlled by said cam means for controlling the relation between said tool and the work.

4. A machine of the class described comprising a frame having end portions, at least one of said end portions including a chamber, spaced front and back walls connecting said end portions and defining therewith a chip space, a headstock above one of said end portions for supporting work over said chip space, a rockable and axially movable tool bar, a tool carrier fixed to said bar, a former cam movably carried by one of said walls for determining the angular position of said tool bar, and cam means in said chamber for controlling the axial position of said tool bar and the position of said former cam.

5. A machine of the class described comprising a frame having end portions, at least one of said end portions including a chamber, spaced front and back walls connecting said end portions and defining therewith a chip space, a headstock above one of said end portions for supporting work over said chip space, a rockable and axially movable tool bar, a tool carrier fixed to said bar, a former cam mounted on one of said walls for movement at an angle to the horizontal for determining the angular position of said tool bar, and cam means in said chamber for controlling the axial position of said tool bar and the position of said former cam.

6. A machine of the class described comprising a frame having end portions, at least one of said end portions including a chamber, spaced front and back walls connecting said end portions and defining therewith a chip space, a headstock above one of said end portions for supporting work over said chip space, a rockable and axially movable tool bar, a tool carrier fixed to said bar, guides pivoted to one of said walls for tilting adjustment, a former cam slidable in said guides for determining the angular position of said tool bar, and cam means in said chamber for controlling the axial position of said tool bar and the position of said former cam.

7. A machine of the class described comprising a frame having end portions, at least one of said end portions including a chamber, spaced front and back walls connecting said end portions and defining therewith a chip space, a headstock above one of said end portions for supporting work over said chip space, a pair of rockable and axially movable tool bars, a tool carrier fixed to each bar for tools to operate on said work, guides pivoted to said front and back walls for tilting adjustment thereon, a former cam slidable in each of said guides for controlling the angular positions of said bars, and cam means in said chamber for controlling the axial positions of said tool bars and the positions of said former cams.

8. A machine of the class described comprising a frame having end portions, at least one of said end portions including a chamber having end walls, said end portions being spaced apart to define a chip space therebetween, means for supporting work and tools in vertical alinement within the horizontal area of said chip space, a shaft journaled in said end walls, and cam mechanism having members carried by said shaft for controlling the cycle of operations of said machine, certain of said members being positioned within said chamber, said chip space being free from cam mechanism.

9. A machine of the class described comprising spaced end frame portions each including a chamber, the space between said portions forming a chip space, means for supporting work and tools in operative relation in vertical alinement within the horizontal area of said chip space, and cam mechanism within said chambers for controlling the relations between the work and said tools, said chip space being free from cam mechanism.

10. A machine of the class described comprising spaced end frame portions each including a chamber, a headstock supported on one of said end frame portions, a tailstock supported on the other of said end frame portions, a plurality of rockable and axially movable tool bars, tool holders carried by said bars in position for tools thereon to operate on work carried by said stocks in vertical alinement with the space between said end frame portions, cam means within said chambers, and means controlled by said cam means for controlling the axial and angular positions of said tool bars.

11. A machine of the class described comprising a headstock, a tailstock, tool carriers for supporting tools in operative relation to work carried between said stocks, a shaft underlying said head and tailstock and the work, cam drums fixed to said shaft beneath said head and tailstocks, said shaft beneath the work being free from cam drums, and means including cams on said drums for determining the cycle of operations of said machine.

12. A machine of the class described comprising a headstock, a tailstock, tool carriers for supporting tools in operative relation to work carried between said stocks, a shaft underlying said head and tailstock and the work, cam drums fixed to said shaft beneath said head and tailstocks, and outwardly of said head and tailstocks, said shaft beneath the work being free from cam drums, and means including cams on said drums for determining the cycle of operations of said machine.

13. A machine of the class described comprising work supporting means, an axially movable and rockable tool carrier for supporting a tool in operative relation to work carried by said supporting means, a cam drum, cams thereon, and connections from said drum for controlling the motions of said carrier, connections for one of its motions including a lever having one arm in operative relation to certain of said cams and the other arm in operative relation to said tool carrier.

14. A machine of the class described comprising a frame, an axially movable and rockable tool bar carried by said frame, means on said frame for supporting work, a tool carrier supported by said bar, a cam drum within said frame, and means for operatively connecting said drum and tool bar including a cam follower carrier positioned adjacent to said drum for movement axially of said drum by engagement therewith of cams carried by said drum, said follower carrier having a portion in sliding engagement with said frame to prevent rotation of said follower.

15. A machine of the class described comprising a frame, an axially movable and rockable tool bar carried by said frame, means on said frame for supporting work, a tool carrier supported by said bar, a cam drum within said frame, and means for operatively connecting said drum and tool bar including a cam follower carrier mounted on said tool bar and positioned adjacent to said drum for movement axially of said drum by engagement therewith of cams carried by said drum, said follower carrier having a portion in sliding engagement with said frame to prevent rotation of said follower.

16. A machine of the class described comprising a frame having a headstock and a chip space, a shaft extending beneath said headstock, three movable tool bars each arranged substantially parallel to said shaft, tool carriers fixed to said bars in position for tools thereon to operate on work carried by said headstock above said chip space, and cams on said shaft for controlling the movements of said bars, said chip space being free from cams.

17. A machine of the class described comprising a frame having a headstock, a pair of axially movable and rockable tool bars, tool carriers on said bars for supporting tools in operative relation to work held to said headstock, cam means for controlling the axial and angular positions of the first of said bars, a slide on the second bar, cam means for moving said slide, connections from said slide to the said first bar to control the axial position of said first bar by the position of said slide, and means controlled by the angular position of said second bar for determining the angular position of said first bar.

18. A machine of the class described comprising a frame having a headstock, a pair of axially movable and rockable tool bars, tool carriers on said bars for supporting tools in operative relation to work held to said headstock, cam means for controlling the axial and angular positions of the first of said bars, a slide on the second bar, cam means for moving said slide, connections from said slide to the said first bar to control the axial position of said first bar by the position of said slide, and means controlled by the angular position of said second bar for maintaining the first bar in a fixed angular position during a portion of its axial movement, and for changing the angular position of said first bar during another portion of its axial movement.

19. A machine of the class described comprising a headstock having a spindle, a drive shaft in said headstock for said spindle, tool carriers, a cam drum beneath said headstock, cams on said drum, means controlled by said cams for controlling said tool carriers, a jack shaft extending downwardly from said headstock on each side of said headstock and in driven relation to said drive shaft, a high speed driving connection from one of said jack shafts to said cam drum, a low speed driving connection from the other of said jack shafts to said drum, and means for rendering either selected driving connection operative and for rendering the other of said connections inoperative.

20. A speed controlling mechanism comprising a drive shaft having a pair of gears of different diameters fixed thereto, a driven shaft having journaled hereon larger and smaller diameter gears meshing with the gears of said drive shaft, a clutch actuable to clutch the smaller of said journaled gears to said driven shaft to drive said driven shaft at high speed, a ratchet mechanism connecting the larger of said journaled gears with said driven shaft to permit overrunning of said driven shaft when said clutch is in clutching relation and acting to cause rotation of said larger gear to drive said driven shaft when said clutch is in inoperative relation, and means acting to frictionally engage said larger gear and drive shaft to prevent overrunning of said ratchet mechanism when said clutch is in inoperative position, said means automatically releasing when said clutch is rendered operative.

21. A machine of the class described comprising a frame, a headstock supported by said frame, a rotary spindle in said headstock, driving means for said spindle including speed change mechanism, tools for operating on work rotatable with said spindle, a shaft carried by said frame, and cams carried by said shaft under said headstock for controlling the positions of said tools and said speed change mechanism.

22. A machine of the class described comprising a frame, a headstock supported by said frame, tools for operating on work supported by said headstock, said frame having a chamber beneath said headstock, a shaft extending through said chamber, a cam drum fixed to said shaft within said chamber, cams on said drum for controlling said tools, means including a speed change mechanism for rotating said shaft and drum, and cam means on said shaft outwardly of said chamber for controlling said speed change mechanism.

23. A machine of the class described comprising a frame having a headstock, a chamber under said headstock, a tailstock, two rockable and axially movable tool bars, one beneath work supported between said head and tailstocks, a second bar outwardly of said frame, and a rockable tool bar between said first and second bars, a cam drum in said chamber, cams on said drum for controlling the axial and angular positions of said first and second tool bars, and cam mechanism at the tailstock end of the machine for controlling the rocking of said third bar.

24. A machine of the class described comprising a frame having spaced wall members defining a chip space and a chamber at at least one end of said chip space, means for supporting work above said space, rockable and axially movable parallel tool bars one located between said walls beneath the work, and a second located outwardly of said walls, and a rockable tool bar located between said two bars, a cam shaft positioned beneath said first mentioned tool bar and extending through said chamber, cam drums on said shaft, at least one of said drums being positioned in a chamber, and cams on said drums for controlling the axial and angular positions of said axially movable bars and the angular position of said rockable bar.

25. A machine of the class described comprising a frame having spaced wall members defining a chip space, means for holding work above said chip space, an axially movable and rockable tool bar positioned between said walls beneath the work for carrying tools in operative relation to said work, said frame having a chamber at one end beyond said chip space, a cam drum located in said chamber, and cams on said drum for controlling the axial and angular position of said tool bar.

26. A machine of the class described comprising a frame having spaced wall members defining a chip space, means for holding work above said chip space, an axially movable and rockable tool bar positioned between said walls beneath the work and an axially rockable and movable tool bar positioned outwardly of one of said walls for carrying tools in operative relation to said work, said frame having a chamber at one end beyond said chip space, a cam drum located in said chamber, and cams on said drum for controlling the axial and angular position of said tool bars.

27. A machine of the class described comprising a frame having a base, a headstock supported by said base, said base having a chamber beneath said headstock, tools for operating on work supported by said headstock, means for stopping the machine, a shaft, a cam drum on said shaft in said chamber, cams on said drum for controlling the positions of said tools, and cam means carried by said shaft outside of said chamber for controlling said stopping means.

JOHN E. LOVELY.